US012417868B2

(12) United States Patent
Daugherty et al.

(10) Patent No.: US 12,417,868 B2
(45) Date of Patent: Sep. 16, 2025

(54) MAGNET ARRAY HOLDER ACCELERATED ASSEMBLY AND IMPROVED ALIGNMENT IN VACUUM ELECTRONIC DEVICES

(71) Applicant: Elve Inc., Davis, CA (US)

(72) Inventors: Diana Gamzina Daugherty, Davis, CA (US); Arnela Sinevod, Dixon, CA (US); Michelle Gonzalez, Woodland, CA (US)

(73) Assignee: Elve Inc., Davis, CA (US)

( * ) Notice: Subject to any disclaimer, the term of this patent is extended or adjusted under 35 U.S.C. 154(b) by 226 days.

(21) Appl. No.: 18/208,698

(22) Filed: Jun. 12, 2023

(65) Prior Publication Data

US 2023/0402214 A1 Dec. 14, 2023

Related U.S. Application Data

(60) Provisional application No. 63/351,409, filed on Jun. 12, 2022.

(51) Int. Cl.
*H01F 7/02* (2006.01)
*H01F 41/00* (2006.01)

(52) U.S. Cl.
CPC ........... *H01F 7/0205* (2013.01); *H01F 41/00* (2013.01)

(58) Field of Classification Search
CPC ....... H01F 7/0205; H01F 41/00; H01F 7/0221
See application file for complete search history.

(56) References Cited

U.S. PATENT DOCUMENTS 3,324,339 A 6/1967 Winslow et al.
4,198,614 A 4/1980 Ragland, Jr.
2008/0024236 A1 1/2008 Dayton
2015/0109080 A1* 4/2015 Fullerton ............. H01F 7/0205 335/304
2022/0157550 A1 5/2022 Daugherty

FOREIGN PATENT DOCUMENTS

WO WO-2007125129 A1 * 11/2007 ............ H02N 15/00

* cited by examiner

*Primary Examiner* — Mohamad A Musleh
(74) *Attorney, Agent, or Firm* — Sheppard Mullin Richter & Hampton LLP

(57) ABSTRACT

A magnet array holder configured to retain magnet pieces and/or non-magnet pieces to form a magnet array, the magnet array configured to manipulate one or more electron beams in a vacuum electronic device when assembled, the magnet array holder comprising a set of slots configured to receive magnet and/or non-magnet pieces; a set of pockets to receive magnet and/or non-magnet pieces; and one or more attachment interfaces configured to couple the magnet array holder to a vacuum electronic device.

13 Claims, 22 Drawing Sheets

MAGNET ARRAY HOLDER ACCELERATED ASSEMBLY AND IMPROVED ALIGNMENT IN VACUUM ELECTRONIC DEVICES

PRIORITY CLAIM

This application claims benefit of and hereby incorporates by reference provisional patent application Ser. No. 63/351,409, entitled "Magnet Array Holder for Accelerated Assembly and Improved Alignment in Vacuum Electronic Devices," filed on Jun. 12, 2022, by inventors Daugherty, et al.

TECHNICAL FIELD

Embodiments of the invention relate generally to vacuum electronic devices, and more particularly provide a magnet array holder for accelerated assembly and improved alignment in vacuum electronic devices, especially when operating at millimeter wave frequencies and higher.

BACKGROUND

Vacuum electronic devices take advantage of the interaction between one or more electron beams and one or more electromagnetic waves generated in the interaction region. The construction of vacuum electronic devices requires incorporation of metallic, ceramic, magnetic and/or other types of materials into a single assembly. The assembly encapsulates a vacuum chamber or cavity where the interaction between the electron beam(s) and the electromagnetic wave(s) takes place. Examples of vacuum electron devices include, but are not limited to, particle accelerators, klystrons, gyrotrons, gyro-klystrons, travelling wave tubes (TWTs), gyro-TWTs, backward wave oscillators, magnetrons, cross-field amplifiers, free electron lasers, ubitrons, and the like.

Electron beam propagation through a beam tunnel of a vacuum electronic device is conventionally achieved utilizing magnetic and/or electrostatic fields. In vacuum electronic devices operating at millimeter and near-terahertz frequencies, magnetic fields are primarily used. Permanent magnets, electromagnets, as well as periodic magnet arrays are commonly employed to confine the beam to the beam tunnel.

Challenges arise when assembling the vacuum electronic device and preparing it for operation. First, the beam tunnel, magnetic center line, and injection location of the beam are often not co-aligned due to manufacturing and assembly irregularities. The challenge is especially pronounced in higher frequency devices. Second, magnetic material quality is typically inadequate for ensuring that magnetic domains of individual magnets co-align with design domains with the necessary accuracy, which results in magnetic field non-uniformities. As a result, after the vacuum electron beam device is manufactured, a technical expert spends significant time (e.g., months) adjusting (trimming) the magnetic field around the vacuum electronic device to achieve optimal beam transmission. Further, the magnet materials commonly utilized in vacuum electronic devices are of highest grade of magnetization strength and hence are extremely difficult to handle. Their attractive and repulsive forces can be strong enough to cause a rupture or magnet material deployment out of its proper location, which is not only inefficient for assembly but also dangerous for the assembly person.

Finally, magnets are commonly secured with some type of glue, which requires long curing time and significant effort to hold the magnet in its appropriate location accurately for the extended curing time. This slows the assembly process and introduces additional inaccuracies. Further, glue may cause magnet piece position inaccuracy due to the variation of glue thickness joints. Misalignment can be linear, angular, in height and in many other ways. A magnet array assembled in a conventional manner may deviate from design by a significant percentage and hence produce a magnetic field profile far from ideal. This problem is exacerbated in devices operating at high frequencies or in those requiring miniature (millimeter scale to sub-millimeter scale) magnet piece sizes because joint tolerances commonly stay the same and hence stack up to significant nonuniformities.

Systems and methods would be helpful to assist with construction of vacuum electronic devices.

SUMMARY

Disclosed herein is a magnet array holder, magnet array assembly and corresponding methods. The magnet array enables improved electron beam confinement, focusing, and other types of manipulation in vacuum electronic devices. The magnet array holder enables accelerated assembly of the magnet array, and is particularly suitable for automated production of vacuum electronic devices. In some embodiments, the magnet array holder utilizes mechanical fixturing to support and/or control accurate positioning of each magnet and non-magnet piece, while minimizing tolerance stack up. The magnet array holder also assists in controlling the shape and size of the magnet and non-magnet pieces themselves. The magnet array holder also supports insertion of magnet and non-magnet pieces from one direction simplifying process automation. The magnet array holder is further suitable for holding and assembling periodic permanent magnet arrays, Halbach magnet arrays, wiggler arrays, quadrupole magnet arrays, dipole magnet arrays, and a mixture of multiple magnet array types (e.g., periodic permanent magnet array with quadrupole or dipole magnet array). Magnet material of the magnet pieces may include ferromagnetic, diamagnetic and paramagnetic. The magnet array holder can be employed for securing an array of permanent magnets together with electromagnets to achieve desired position accuracy and magnetic circuit performance. Non-magnet pieces may be used for spacing magnet pieces at desired distances to affect the magnetic circuit performance.

In some embodiments, the magnet array holder allows for assembly of high strength magnet pieces that may experience attractive or repulsive forces during assembly, thereby avoiding the significant challenges when manipulating high strength magnet pieces into appropriate sites. The magnet array holder significantly eases manual assembly of the magnet arrays and also eases automation of the assembly process with robotic operations (e.g., pick and place systems).

The magnet array holder accurately locates the magnet pieces in appropriate locations with respect to each other and to other magnet arrays for required alignment. The positions of the magnet pieces can be accurately manufactured into the magnet holder with consistent precision using latest manufacturing techniques, translating that precision directly to the assembly of the magnet pieces onto vacuum electronic device. The magnet array holder captures each magnet piece individually and securely, such that the magnet array can be built without having to hold each magnet in place while glue solidifies. In some embodiments, the magnet array holder and corresponding methods of magnet array assembly eliminates reliance on trying to achieve uniform glue thickness, whether individually or from component to component.

The magnet array holder is especially beneficial for planar magnetic structures employed in sheet electron beam devices or devices that employ wiggler or undulator magnets. In other cases, the magnet array holder may be adapted to apply to round, hollow, gyrating, diverging, converging, and multiple beam magnetic structures.

The invention further provides an automated, computer-implemented method of designing a magnet array holder for accurately manipulating electron beams in a vacuum electronic devices where mechanical features are employed to accurately locate and secure magnet pieces and accelerate assembly. The magnet array holder may employ sites for capturing magnet and non-magnet pieces, marking features to align magnetic polarity, sites heights for holding and positioning magnet and non-magnet pieces, height variation, sites of varying length, additional sites to combine multiple magnet piece types, depths designed to position magnets, single feature for locating individual magnet pieces and magnet array location with respect to other external magnet and non-magnet features, fixturing for additional magnet pieces for shielding, sites combining depth and other component walls, design to predict magnet misalignment minima and maxima, misalignment calculation for modeling of magnetic circuit performance, and the method for a variety of permanent and electro-permanent magnets.

The magnet array holder and techniques disclosed herein are beneficial to achieve high quality alignment and especially beneficial for manufacturing vacuum electronic devices in millimeter wave and near-THz frequencies. A vacuum electronic device using the magnet array holder designed herein may be configured to amplify electromagnetic signals with frequencies ranging from 1 GHz to 1000 GHz and up to 3 THz and/or to 30 THz.

In some embodiments, the present invention provides a magnet array holder configured to retain magnet pieces and/or non-magnet pieces to form a magnet array, the magnet array configured to manipulate one or more electron beams in a vacuum electronic device when assembled, the magnet array holder comprising a set of slots configured to receive magnet and/or non-magnet pieces; a set of pockets to receive magnet and/or non-magnet pieces; and one or more attachment interfaces (hole(s), pin(s), glue(s), clamp(s), weld(s), attaching material, etc.) configured to couple the magnet array holder to a vacuum electronic device. In some embodiments, the magnet array holder 202 may be integrated as part of the vacuum electronic device 100.

Each slot the set of slots may have a first shape and each pocket of the set of pockets may have a second shape different than the first shape. Each pocket of the set of pockets may have a bridge across it. Each pocket of the set of pockets may include a marking indicating a magnet piece orientation to assist in aligning the magnet piece. The marking may include a written key. Each pocket may have a size, shape and position that controls a size, shape and position of the magnet or non-magnet piece received therein. Each slot may have a size, shape and position that controls a size, shape and position of the magnet or non-magnet piece received therein. The magnet array holder may further comprise a set of additional sites configured to receive additional magnet or non-magnet pieces. Each site of the set of additional sites may include a marking indicating a magnet piece orientation to assist in aligning the additional magnet piece. At least one slot of the set of slots may extend through the magnet array holder. The magnet array holder may hold both magnet and non-magnet pieces. The magnet array holder may hold only magnet pieces. The magnet array holder may hold only a portion of the magnetic circuit needed for operation of the vacuum electronic device.

In some embodiments, the present invention provides a method of assembling a magnet array configured to manipulate one or more electron beams in a vacuum electronic device, the method comprising providing a magnet array holder configured to retain magnet pieces and/or non-magnet pieces, the magnet array holder comprising a set of slots configured to receive magnet and/or non-magnet pieces, a set of pockets to receive magnet and/or non-magnet pieces, and one or more interfaces for securing or attaching to couple to a vacuum electronic device; positioning at least a pair of magnet or non-magnet pieces within the set of slots adjacent a particular pocket of the set of pockets; and positioning a particular magnet piece within the particular pocket of the set of pockets, the pair of magnet or non-magnet pieces acting as walls to support insertion of the particular magnet piece.

Each pocket of the set of pockets may have a bridge across it. Each slot of the set of slots may be configured to receive a respective non-magnetic piece. Each slot of the set of slots may be configured to receive a magnet piece having an up/down polarization orientation. Positioning the particular magnet piece within the particular pocket may include orienting its polarity in accordance with a marking. The magnet array holder may further include a set of additional sites configured to receive additional magnet and/or non-magnet pieces; and the method may further comprise positioning additional magnet pieces within the additional sites. Positioning the additional magnet and/or non-magnet pieces may include orienting polarities in accordance with markings.

The disclosure described herein provides an example of applying slotting techniques to assembly of rectangular magnets. Same approach of using slot depths and varying piece heights can be employed for assembly of cylindrically symmetric magnets and non-magnets.

DETAILED DESCRIPTION

Figure 1:
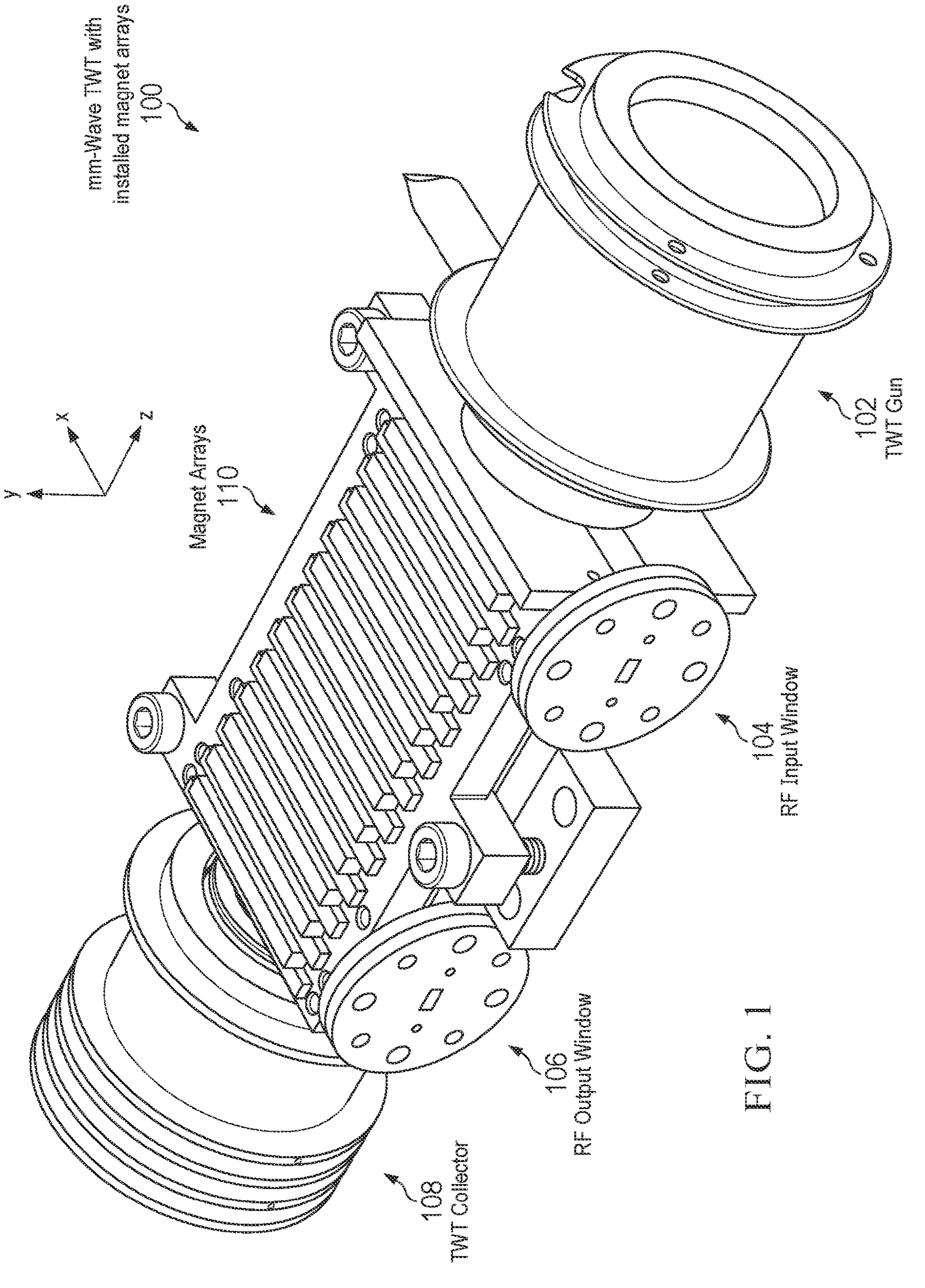
FIG. 1 illustrates components of an example vacuum electron device, e.g., an example traveling wave tube (TWT), showing example magnet arrays affixed thereto in accordance with embodiments of the present invention.

Disclosed herein is a magnet array holder, magnet array assembly and corresponding methods. The magnet array enables improved electron beam confinement, focusing, and other types of manipulation in vacuum electronic devices. The magnet array holder enables accelerated assembly of the magnet array, and is particularly suitable for automated production of vacuum electronic devices. In some embodiments, the magnet array holder utilizes mechanical fixturing to support and/or control accurate positioning of each magnet and non-magnet piece, while minimizing tolerance stack up. The magnet array holder also assists in controlling the shape and size of the magnet and non-magnet pieces themselves. The magnet array holder also supports insertion of magnet and non-magnet pieces from one direction simplifying process automation. The magnet array holder is further suitable for holding and assembling periodic permanent magnet arrays, Halbach magnet arrays, wiggler arrays, quadrupole magnet arrays, dipole magnet arrays, and a mixture of multiple magnet array types (e.g., periodic permanent magnet array with quadrupole or dipole magnet array). Magnet material of the magnet pieces may include ferromagnetic, diamagnetic and paramagnetic. The magnet array holder can be employed for securing an array of permanent magnets together with electromagnets to achieve desired position accuracy and magnetic circuit performance. Non-magnet pieces may be used for spacing magnet pieces at desired distances to affect the magnetic circuit performance.

In some embodiments, the magnet array holder allows for assembly of high strength magnet pieces that may experience attractive or repulsive forces during assembly, thereby avoiding the significant challenges when manipulating high strength magnet pieces into appropriate sites. The magnet array holder significantly eases manual assembly of the magnet arrays and also eases automation of the assembly process with robotic operations (e.g., pick and place systems).

The magnet array holder accurately locates the magnet pieces in appropriate locations with respect to each other and to other magnet arrays for required alignment. The magnet array holder captures each magnet piece individually and securely, such that the magnet array can be built without having to hold each magnet in place while glue solidifies. In some embodiments, the magnet array holder and corresponding methods of magnet array assembly eliminates reliance on trying to achieve uniform glue thickness, whether individually or from component to component.

The magnet array holder is especially beneficial for planar magnetic structures employed in sheet electron beam devices or devices that employ wiggler or undulator magnets. In other cases, the magnet array holder may be adapted to apply to round, hollow, gyrating, diverging, converging, and multiple beam magnetic structures.

The invention further provides an automated, computer-implemented method of designing a magnet array holder for accurately manipulating electron beams in a vacuum electronic devices where mechanical features are employed to accurately locate and secure magnet pieces and accelerate assembly. The magnet array holder may employ sites for capturing magnet and non-magnet pieces, marking features to align magnetic polarity, sites heights for holding and positioning magnet and non-magnet pieces, height variation, sites of varying length, additional sites to combine multiple magnet piece types, depths designed to position magnets, single feature for locating individual magnet pieces and magnet array location with respect to other external magnet and non-magnet features, fixturing for additional magnet pieces for shielding, sites combining depth and other component walls, design to predict magnet misalignment minima and maxima, misalignment calculation for modeling of magnetic circuit performance, and the method for a variety of permanent and electro-permanent magnets.

The magnet array holder and techniques disclosed herein are beneficial to achieve high quality alignment and especially beneficial for manufacturing vacuum electronic devices in millimeter wave and near-THz frequencies. A vacuum electronic device using the magnet array holder designed herein may be configured to amplify electromagnetic signals with frequencies ranging from 1 GHz to 1000 GHz.

FIG. 1 illustrates components of an example vacuum electronic device 100, e.g., an example traveling wave tube (TWT) 100, having magnet arrays 110 (magnet array assemblies) affixed thereto in accordance with some embodiments of the present invention. Although FIG. 1 is shown with regard to a TWT, the magnet arrays 110 herein can be used with any vacuum electronic device 100 that uses magnet assemblies to manipulate one or more electron beams in an interaction region.

The TWT 100 includes a TWT gun 102 configured to generate one or more electron beams (that are transmitted in the z-direction). The TWT gun 102 may be employed for sheets beam, hollow beams, pencil, distributed beams, multiple beams, etc. The TWT 100 further includes an interaction circuit, including an RF input window 104, an RF output window 106, and two magnet arrays 110 configured to direct and shape the one or more electron beams through the interaction circuit. The two magnet arrays 110 include a top magnet array 110 shown on the top of the TWT 100 and a bottom magnet array as a mirror image on the bottom of the TWT 100. Although the bottom magnet array 110 is not clearly shown in FIG. 1, the iron shield of both the top and bottom magnet arrays 110 are shown. The TWT 100 further includes a TWT collector 108 configured to collect the one or more electron beams being transmitted through the TWT 100.

Figure 2A:
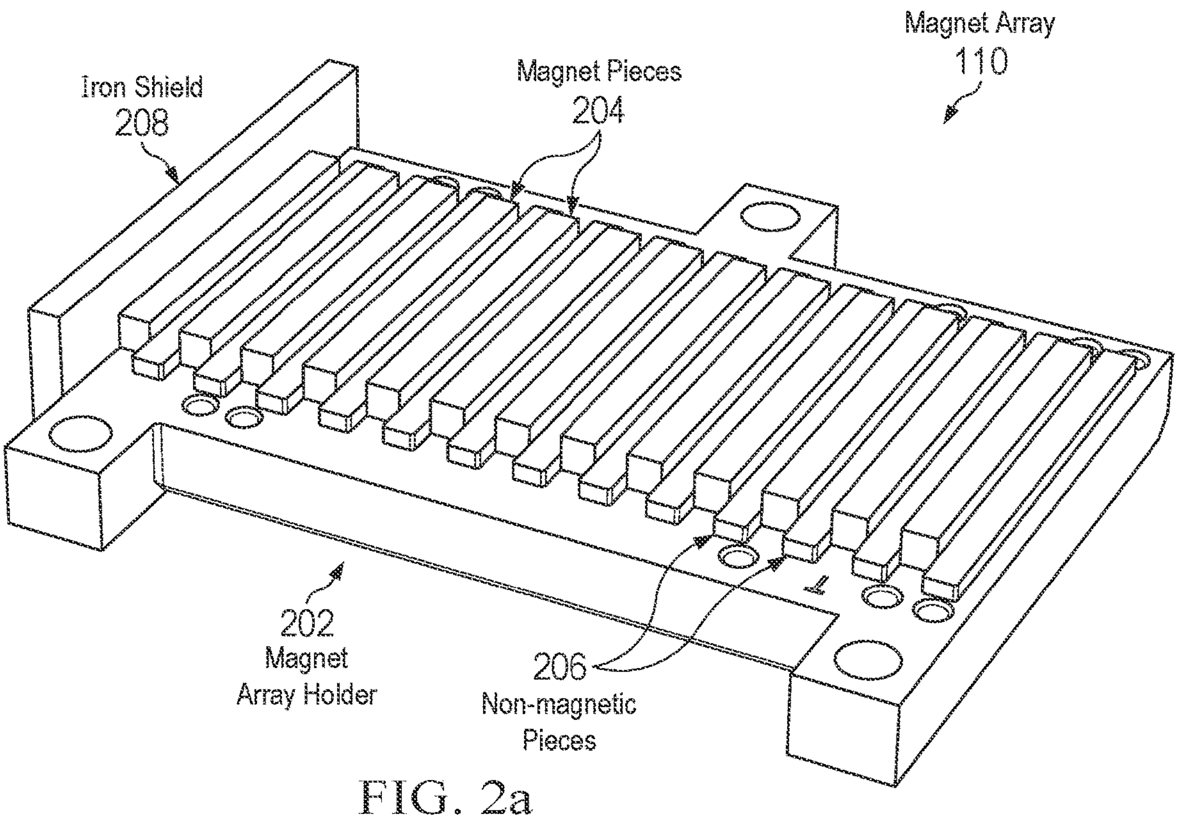
FIG. 2*a* illustrates a top perspective view of an example magnet array in accordance with some first embodiments of the present invention.

FIG. 2*a* illustrates a top perspective view of an example magnet array 110 in accordance with some first embodiments of the present invention. The magnet array 110 includes a magnet array holder 202, magnet pieces 204 positioned in sites in the magnet array holder 202, non-magnet pieces 206 positioned in sites in the magnetic array holder 202, and an iron shield 208 positioned on the front edge of the magnet array holder (the side adjacent the TWT gun 102 of the TWT 100).

The magnet array holder 202 may be made of non-magnetic materials such as aluminum or its aluminum alloys, titanium or its alloys, copper or its alloys, stainless steel, and/or the like. Magnetic materials can be employed for creating the entire or part of the magnet array holder 202 to achieve desired magnetic circuit properties and hence magnetic field.

The sites provide example mechanical features to accurately secure magnet and non-magnet pieces in appropriate places. Examples sites (shown specifically at least in FIGS. 2*d* and 2*e*) can be slots (e.g., having guide rails), pockets, cutouts, or other type of receiving feature. In some embodiments, magnet pieces 204 can be positioned in pockets and non-magnet pieces 206 can be positioned in slots. Alternatively, both can be positioned in pockets, both can be positioned in slots, magnet pieces 204 can be located in pockets and/or slots, and/or non-magnet pieces 206 can be located in pockets and/or slots. Any combination is possible.

Each site (pocket, slot or cutout) control the position, size and direction of the magnet pieces 204 and/or non-magnet pieces 206. The position and size include length, depth, width, vertical position (y-axis), lateral position (x-axis), longitudinal position (z-axis), etc.). The sites may be implemented symmetrically or asymmetrically to achieve desired results. The position and size of each site, and the corresponding magnet pieces 204 and non-magnet pieces 206 placed therein, may be modeled to achieve desired magnetic interaction circuit performance.

The magnet and non-magnet pieces 204 and 206 may be secured in their respective sites without requiring immediate glue application. In some embodiments, when glue is added, the glue does not affect the positioning of the magnet and/or non-magnet pieces 204 and 206. In some embodiments, each site may be configured to receive more than one magnet piece 204, more than one and non-magnet piece 206 and/or a combination of magnet and non-magnet pieces 204 and 206.

It will be appreciated that the heights of the magnet pieces 204 and/or non-magnet pieces 206 may be varied to provide desired clearance between the individual magnet and non-magnet pieces 204 and 206. An automated assembly process may utilize extra height for grabbing the magnet and non-magnet pieces 204 and 206 and inserting them into respective sites. Height variations can be employed to insert magnet pieces 204 and/or non-magnet pieces 206 in a desired order. The height of the magnet pieces 204 and/or non-magnet pieces 206 also may be modeled to achieve desired magnetic interaction circuit performance.

Depths of the magnet pieces 204 and non-magnet pieces 206 may be used to provide an additional level of isolation and alignment between different types of magnet pieces 204 and/or non-magnet pieces 206 in the assembly, similarly to length, height and width. The walls of the sites may be configured to serve as additional constraints on a magnet piece 204 while it is being inserted and after it has been inserted into the site. The depth may provide location positioning accuracy.

As shown, the exposed side of the example magnet array 110 includes an alternating sequence of magnet and non-magnet pieces 204 and 206 across the length of the magnet array holder 202, although other sequences are possible based on the desired magnetic interaction circuit performance. As shown, the magnet pieces 204 are positioned such that their upper surfaces terminate vertically in a single plane higher than the non-magnet pieces 206, which also terminate in a single plane.

The magnet array holder 202 can be configured for vacuum electronic devices operating at a variety of frequencies, but it especially benefits devices operating between 25 GHz and 1 THz. The magnet array holder 202 is particularly well suited for the range of sizes of electron devices from micrometers to millimeters, and therefore supports the manufacturing and alignment needed for electron beam propagation through the interaction circuit. The magnet array 110 may be configured to amplify electromagnetic signals with frequencies ranging from 1 GHz to 25 GHz, frequencies ranging from 25 GHz to 100 GHz, frequencies ranging from 100 GHz to 250 GHz, frequencies ranging from 250 GHz to 500 GHz, or frequencies ranging from 500 GHz to 1000 GHz. Other frequency ranges are also possible.

Although the magnet array holder 202 is shown to include slots 214 through the entire magnet array holder 202, in some embodiments, the magnet array holder 202 may include a solid floor, e.g., on the bottom side of the magnet array holder 202 such that the non-magnet pieces 206 cannot extend past the floor.

The disclosure described herein provides an example of applying slotting techniques to assembly of rectangular magnets. Same approach of using slot depths and varying piece heights can be employed for assembly of cylindrically symmetric magnets and non-magnets.

Figure 2B:
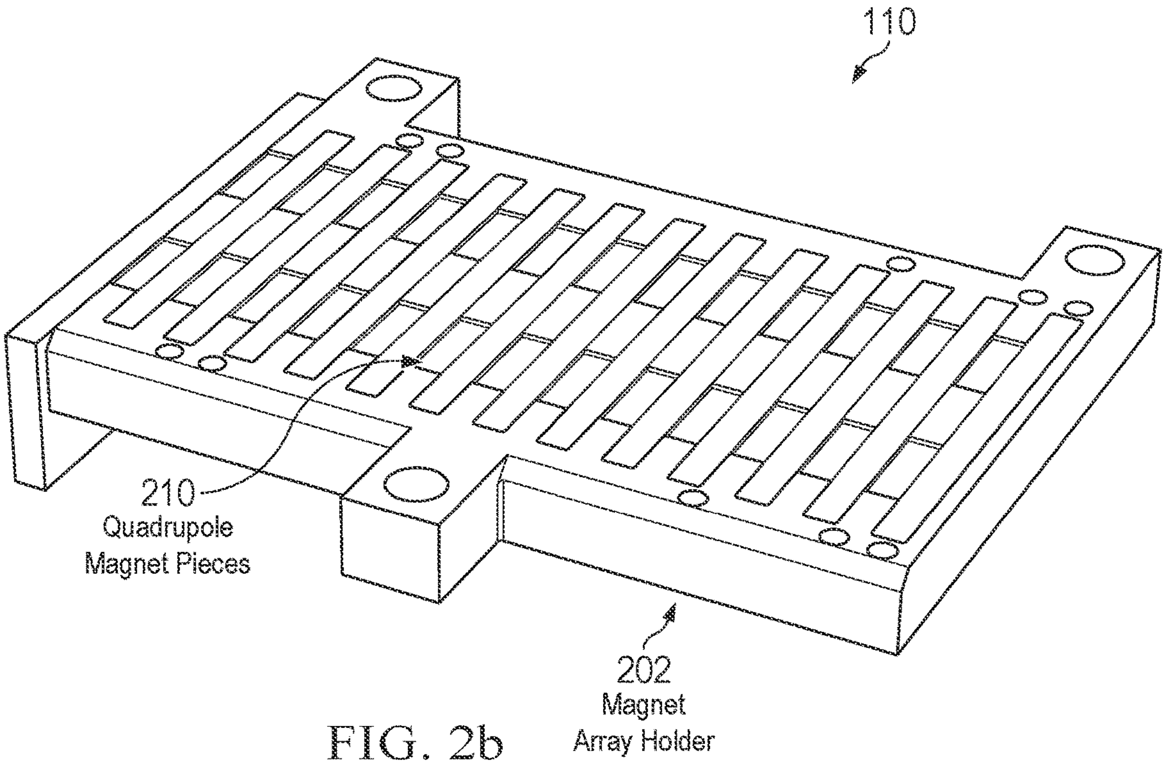
FIG. 2*b* illustrates a bottom perspective view of an example magnet array in accordance with some first embodiments of the present invention.

FIG. 2*b* illustrates a bottom perspective view of the example magnet array 110 in accordance with some first embodiments of the present invention. Additional magnet pieces 210 may be included to combine magnetic circuit types. The additional magnet pieces 210 may be quadrupole and/or dipole magnet pieces 210 configured to add additional magnetic control of the one or more electron beams. The additional magnet pieces 210 may be positioned into pocket type sites (more specifically shown in FIG. 2*e*). As shown, the additional magnet pieces 210 may be positioned as an array of two additional pieces 210 below each magnet piece 204 of the sequence of magnet pieces 204. Although shown below, the additional magnet pieces 210 may be positioned in any other position, e.g., above, adjacent, etc.

In some embodiments, the magnet pieces 204 and non-magnet pieces 206 are configured to control the one or more electron beams in the y-direction. In some embodiments, the additional magnet pieces 210 are configured to control the one or more electron beams in the x-direction.

Figure 2C:
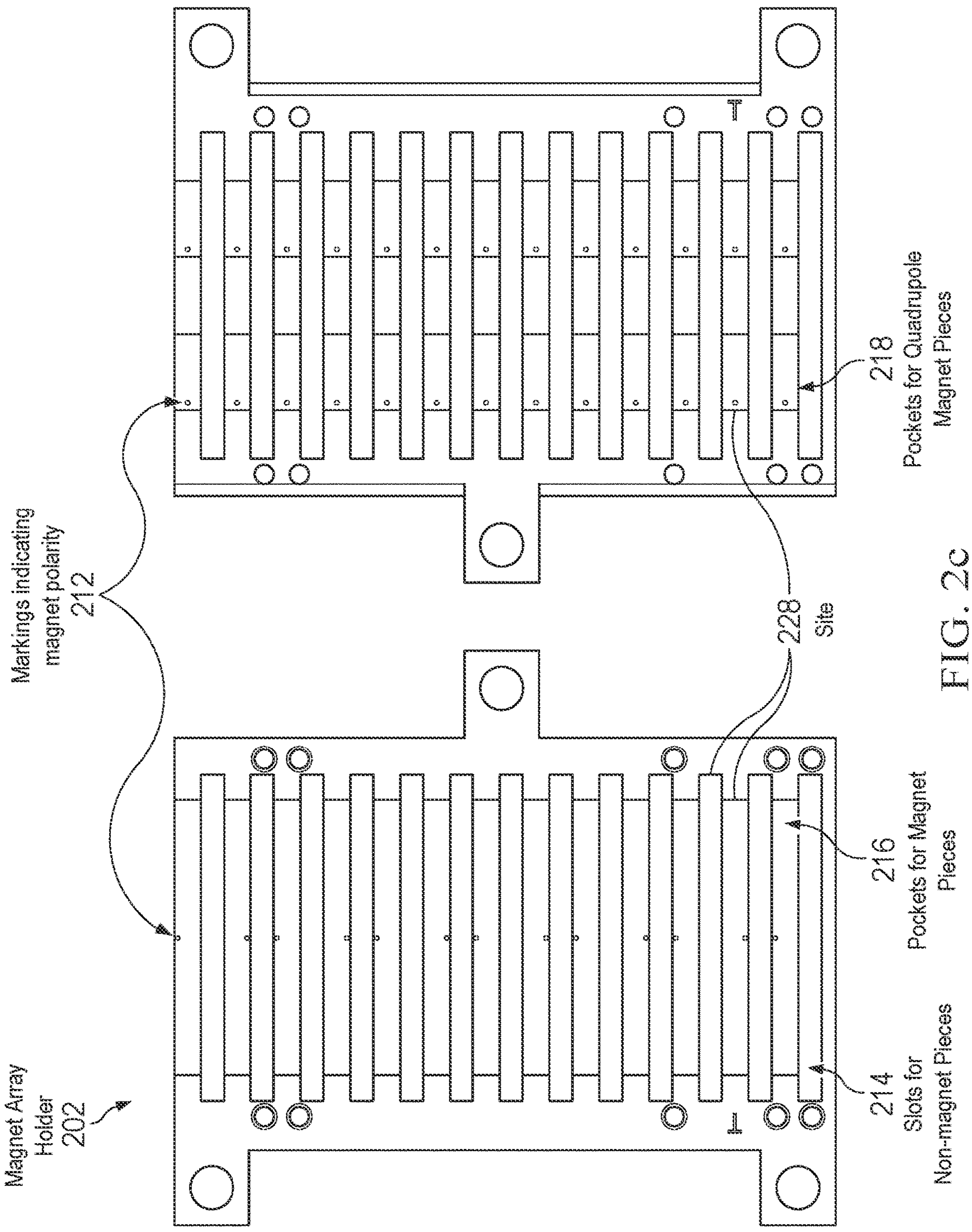
FIG. 2*c* illustrates top and bottom views of an example magnet array holder in accordance with some first embodiments of the present invention.

FIG. 2*c* illustrates top and bottom views of the magnet array holder 202 in accordance with some first embodiments of the present invention.

In some embodiments, as shown, the top side of the magnet array holder 202 includes slots 214 for receiving non-magnet pieces 206 and pockets 216 for receiving magnet pieces 204. In some embodiments, as shown, the bottom side of the magnet array holder 202 includes pockets 218 for receiving the additional (quadrupole) magnet pieces 210. The slots 214, pockets 216 and pockets 218 may be generally referred to as sites 228.

Markings 212 may be added to the pockets 216 of the magnet array holder 202 to identify magnet polarity of magnet pieces 204 to be placed therein, such that an assembly person can match the markings 212 during the assembly process to ensure appropriate magnet orientation. The markings 212 may be added to either or both magnet pieces 204 and the magnet array holder 202. It will be appreciated that the markings 212 may include written markings 212 or physical markings 212 (i.e., keys) to ensure proper orientation of the magnet pieces 204 during assembly.

In some embodiments, as shown, the markings 212 on the top (exposed) side of the magnet array holder 202 depict an alternating pattern of north-directed and south-directed magnet pieces 204 to be positioned in the pockets 216. In some embodiments, as shown, the markings 212 on the bottom side (side positioned against the TWT 100) of the magnet array holder 202 depict an array of south-directed or north-directed or opposing-directed additional (quadrupole) magnet pieces 204 to be positioned in the pockets 218.

In some embodiments, the size and shape of each of the slots 214 may be the same, the size and shape of each of the pockets 216 may be the same, and the size and shape of each of the pockets 218 may be the same. In some embodiments, the size and shape of each of the slots 214, pockets 216 and pockets 218 may each be the same or different. In some embodiments, there may be variations in the size and shape of the size and shape of each of the slots 214, the size and shape of each of the pockets 216, and the size and shape of each of the pockets 218. Any combination is possible.

The fixture also may help align additional external magnet pieces, such as a magnetic shield, outside of the magnet array 110. Additional external pockets or cutouts and alignment features to locate and secure them in place can be added. External magnet pieces can be a part of a complete or partial magnetic circuit.

Figure 2D:
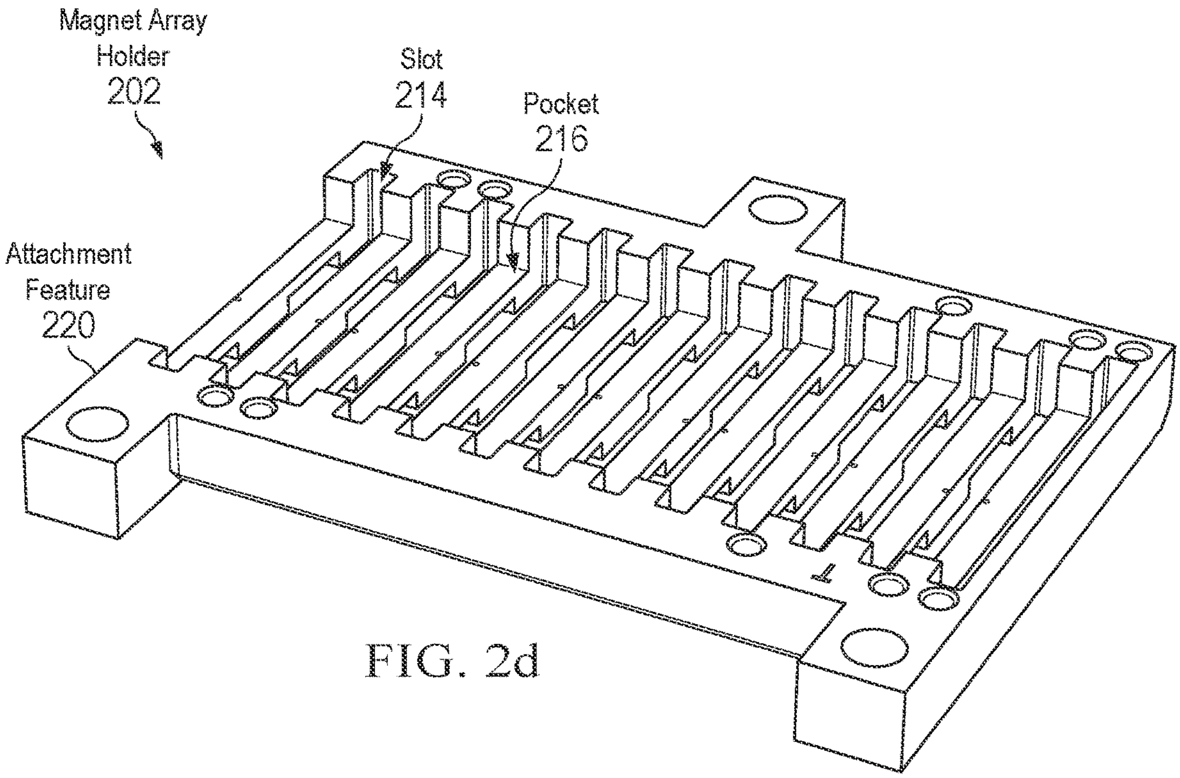
FIG. 2*d* illustrates a top perspective view of an example magnet array holder in accordance with some first embodiments of the present invention.

FIG. 2*d* illustrates a top perspective view of the magnet array holder 202 in accordance with some first embodiments of the present invention. The magnet array holder 202 includes an alternating sequence of slots 214 for receiving the non-magnet pieces 206 and pockets 216 for receiving the magnet pieces 204. The magnet array holder 202 further includes one or more (in this case three) attachment interfaces 220 (e.g., rectangular protrusions with screw hole(s) as shown or additional or alternatively pin(s), glue(s), clamp(s), weld(s), attaching material, etc.) for affixing the magnet array holder 202 to the vacuum electronic device 100. In some embodiments, the magnet array holder 202 may be integrated as part of the vacuum electronic device 100.

Figure 2E:
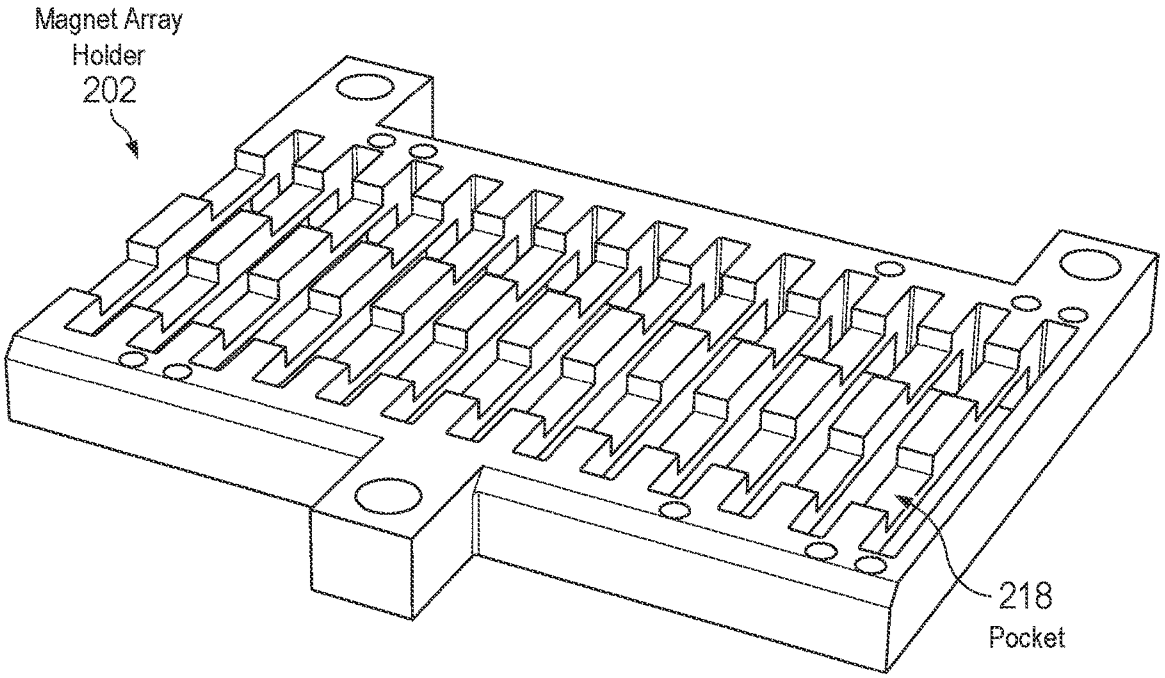
FIG. 2*e* illustrates a bottom perspective view of an example magnet array holder in accordance with some first embodiments of the present invention.

FIG. 2*e* illustrates a bottom perspective view of the magnet array holder 202 in accordance with some first embodiments of the present invention. The magnet array holder 202 includes an array of pockets 216 for receiving additional magnet pieces 210 (e.g., quadrupole magnet pieces).

Figure 2F:
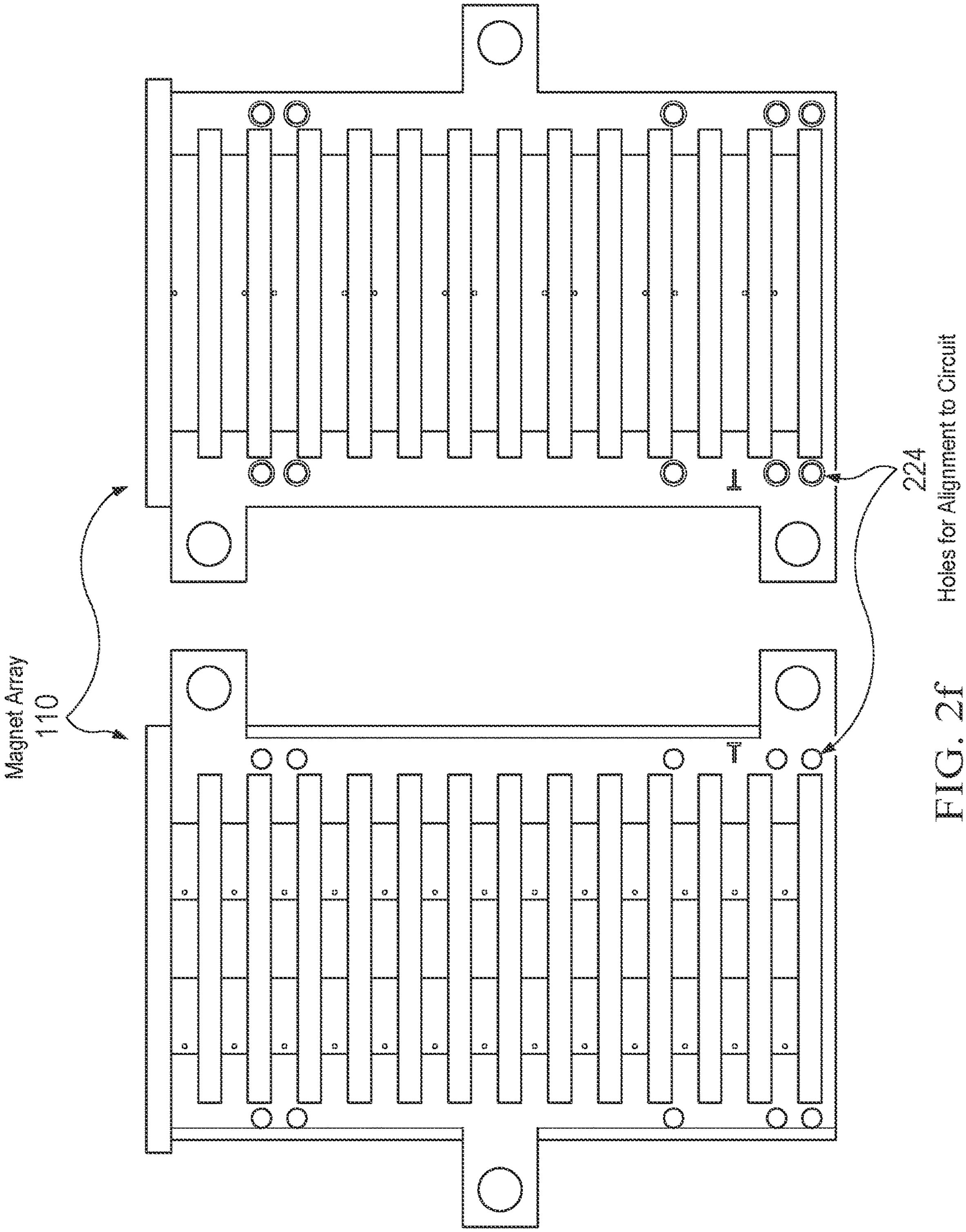
FIG. 2*f* illustrates top and bottom views of an example magnet array in accordance with some first embodiments of the present invention.

FIG. 2*f* illustrates top and bottom views of the magnet array 110 in accordance with some first embodiments of the present invention. As shown, the magnet array 110 includes holes 224 for aligning the magnet array 110.

Figure 2G:
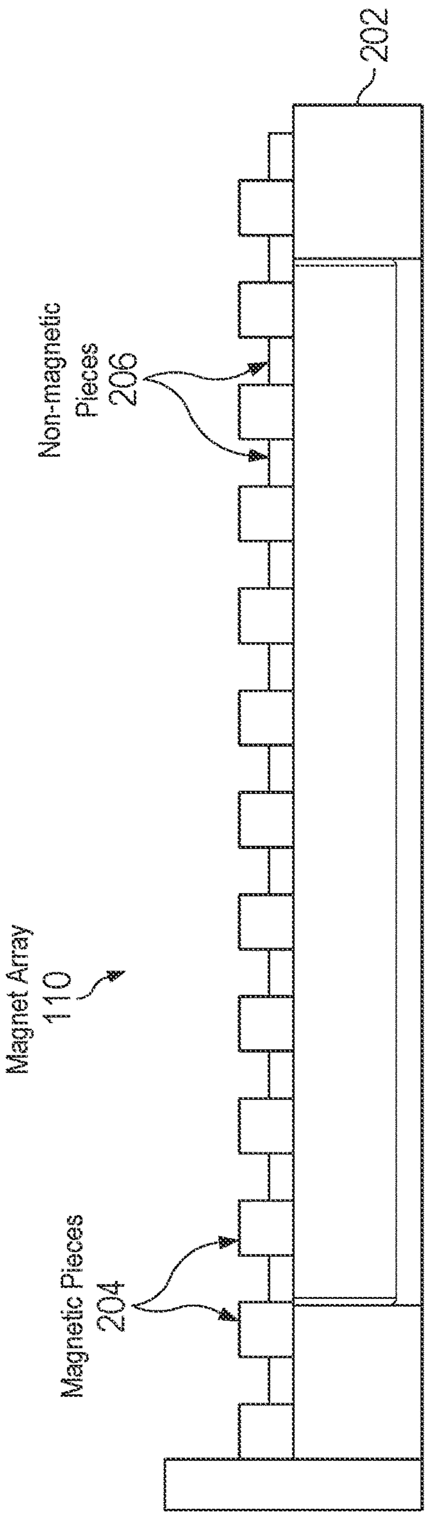
FIG. 2*g* illustrates a side view of an example magnet array in accordance with some first embodiments of the present invention.

FIG. 2*g* illustrates a side view of the magnet array 110 in accordance with some first embodiments of the present invention. As shown, the magnet array 110 includes a magnet array holder 202 with an iron shield 208 attached to the front edge followed by, in this embodiment, an alternating sequence of magnet pieces 204 and non-magnet pieces 206. Other patterns of magnet pieces 204 and non-magnet pieces 206 are also possible to achieve the desired interaction.

Figure 2H:
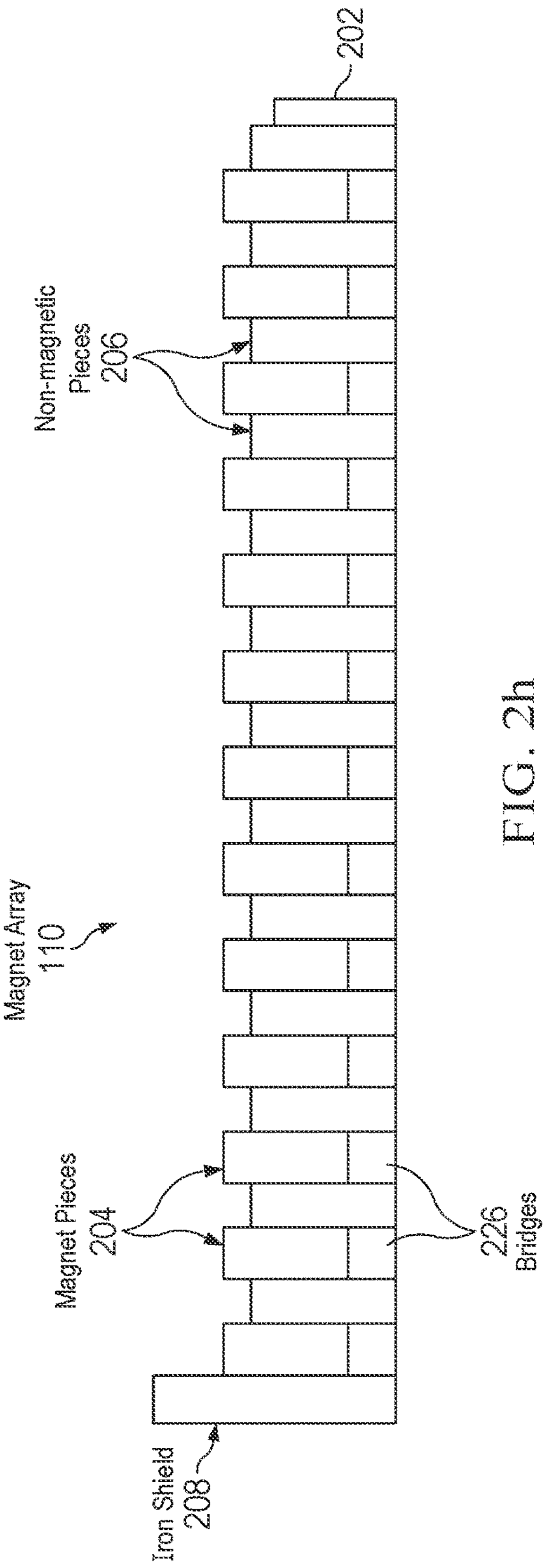
FIG. 2*h* illustrates a cross-sectional side view of an example magnet array in accordance with some first embodiments of the present invention.

FIG. 2*h* illustrates a cross-sectional side view of the magnet array 110 in accordance with some first embodiments of the present invention. The magnet array 110 in FIG.

2*h* assists to show the depth, height position and heights of the magnet pieces 204 and non-magnet pieces 206. In some embodiments, as shown, the magnet pieces 204 rest on top of a sequence of bridges 226 disposed on the bottom of the magnet array holder 202, and the non-magnet pieces 206 extend between and past the bridges 226, fully to (or some embodiments past) the bottom surface of the magnet array holder 202. In some embodiments, the magnet array holder 202 may include a sequence of bridges under the non-magnet pieces 206, and not include a sequence of bridges under the magnet pieces 204. In some embodiments, the magnet array holder 202 may include a sequence of bridges under a combination of magnet pieces 204 and non-magnet pieces 206 (e.g., some or all of each). In some embodiments, the magnet array holder 202 may include a sequence ceilings, instead or in addition to bridges, especially when magnet pieces 204 and/or non-magnet pieces 206 are assembled from below rather than above. Similarly, in some embodiments, the magnet array holder 202 may include walls, instead or in additional to bridges or ceilings, especially when magnet pieces 204 and/or non-magnet pieces are assembled from the side rather from above or below. Other directions are possible. Combinations of different directions are also possible.

Figure 3A:
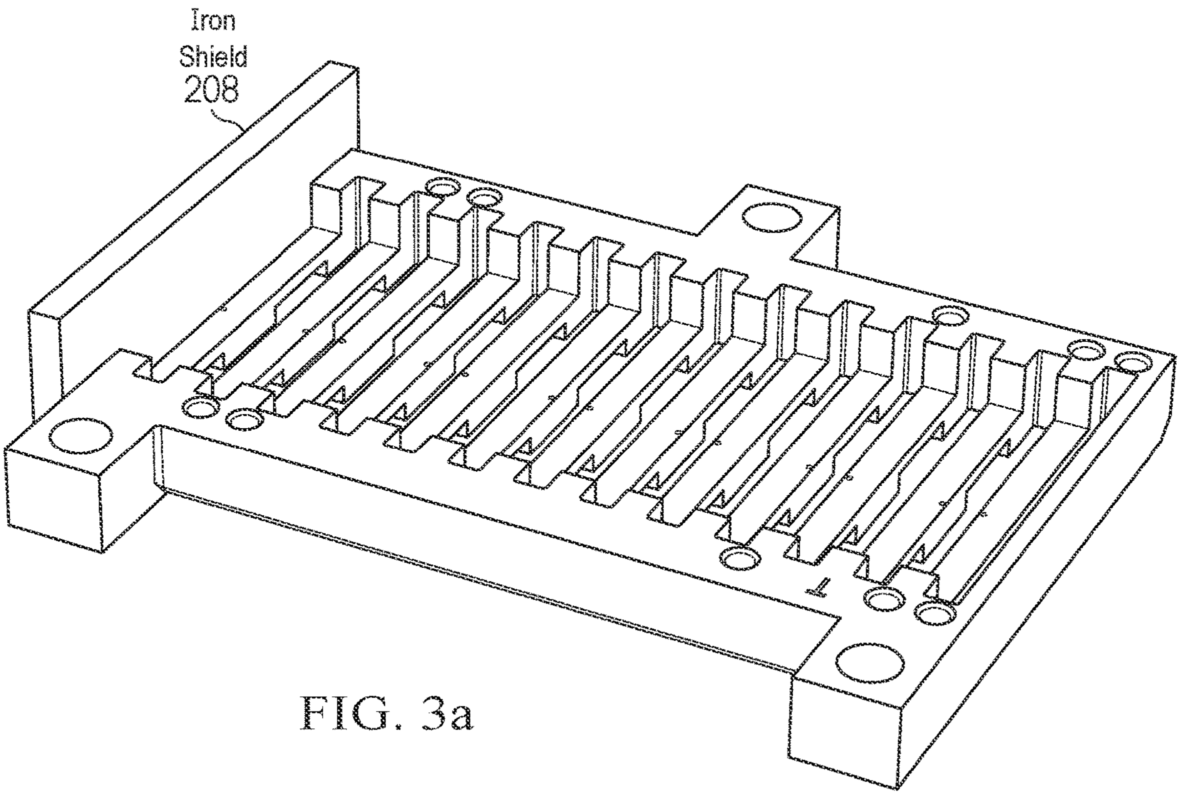
FIG. 3*a* illustrates a top perspective view of an example magnet array holder in accordance with some first embodiments of the present invention.
Figure 3B:
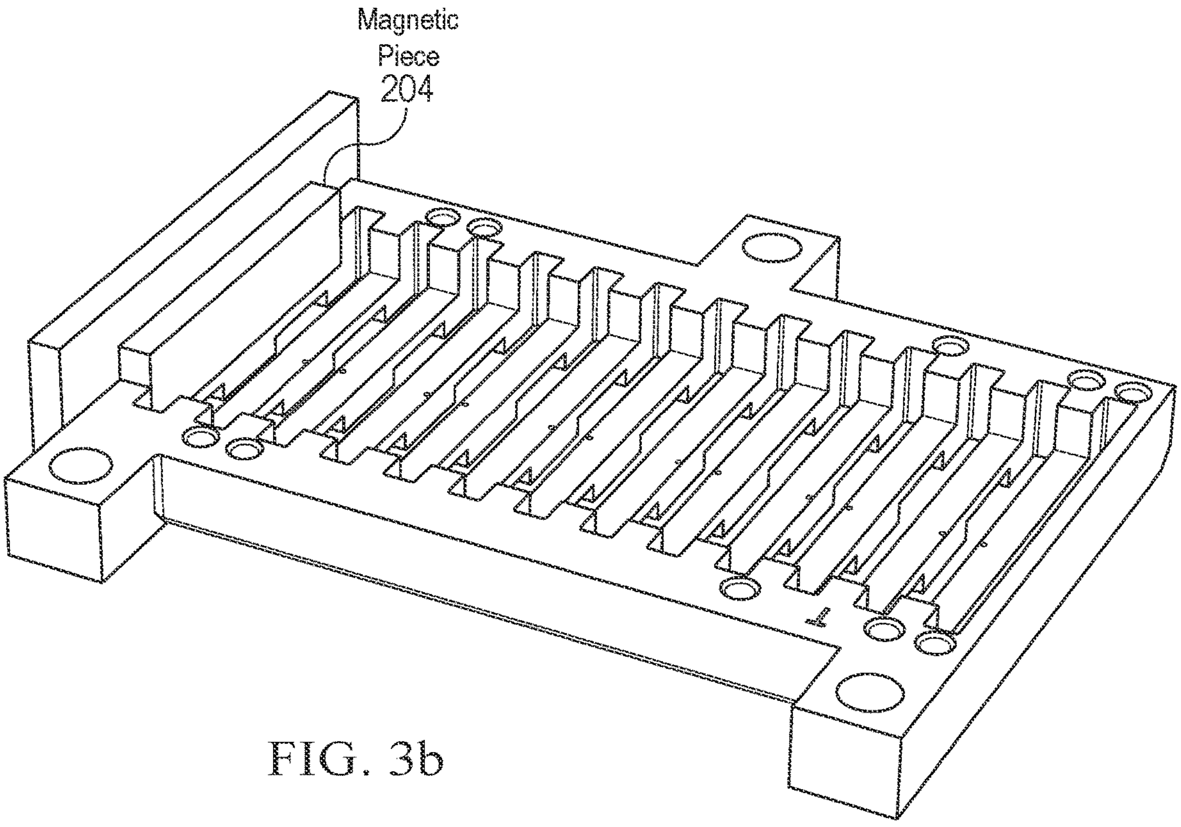
FIG. 3*b* illustrates a top perspective view of an example magnet array holder with one magnet piece positioned therein in accordance with some first embodiments of the present invention.
Figure 3C:
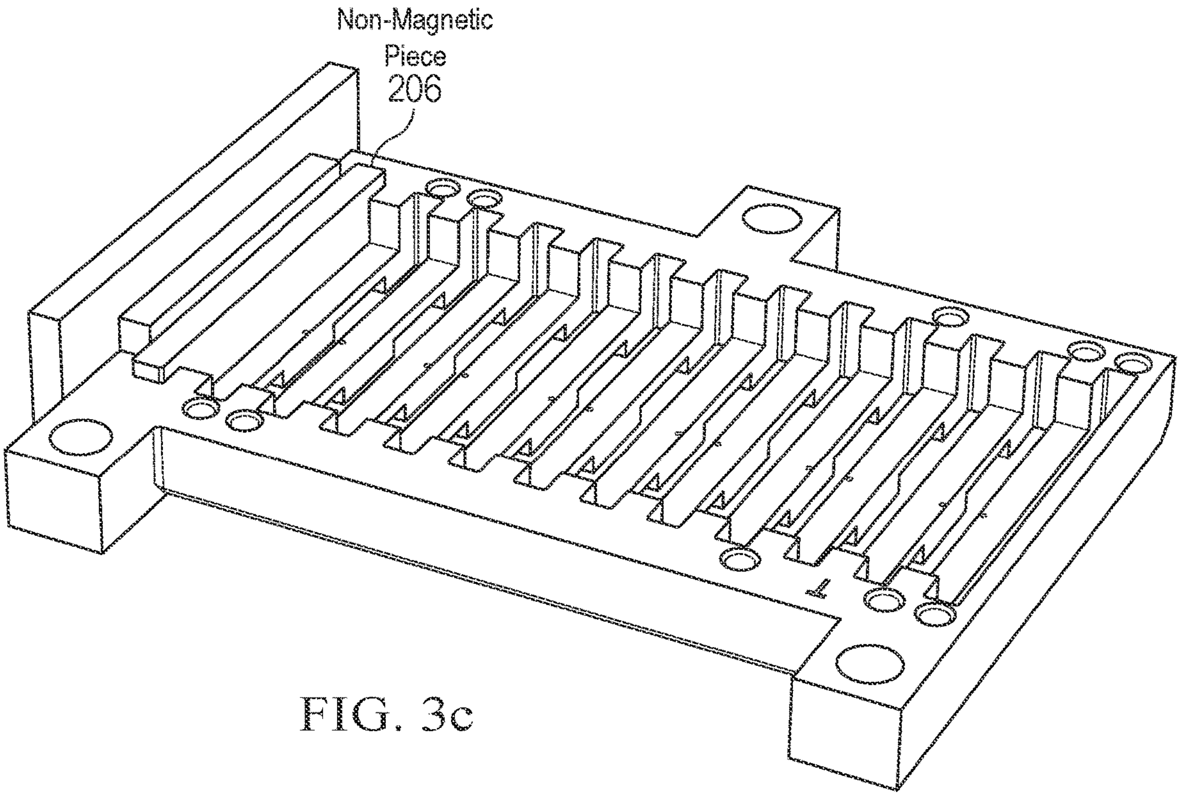
FIG. 3*c* illustrates a top perspective view of an example magnet array holder with one magnet piece and one non-magnet piece positioned therein in accordance with some first embodiments of the present invention.
Figure 3D:
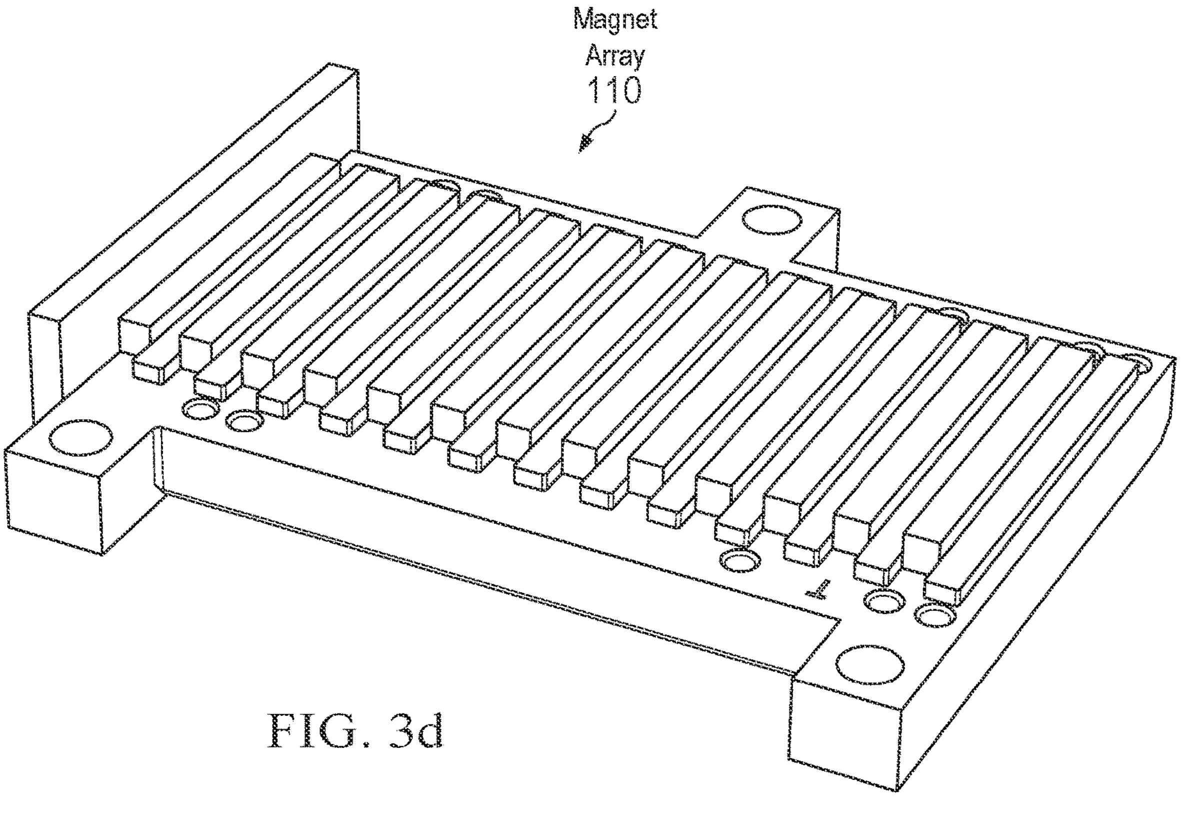
FIG. 3*d* illustrates a top perspective view of an example magnet array holder with all magnet pieces and all non-magnet pieces positioned therein in accordance with some first embodiments of the present invention.

FIG. 3*a*-3*d* shows an example assembly process of the magnet array 110 using the example magnet array holder 202. FIG. 3*a* illustrates a top perspective view of the magnet array holder 202 in accordance with some first embodiments of the present invention. As shown, the iron shield 208 is attached to the front edge of the magnet array holder 202. FIG. 3*b* illustrates a top perspective view of the magnet array holder 202 with one magnet piece 204 positioned adjacent the iron shield 208 and may serve as fixturing for insertion of the next component, in accordance with some first embodiments of the present invention. FIG. 3*c* illustrates a top perspective view of the magnet array holder 202 with one magnet piece 204 and one non-magnet piece 206 positioned adjacent the magnet piece 204 and which may serve as fixturing for insertion of the next component, in accordance with some first embodiments of the present invention. FIG. 3*d* illustrates a top perspective view of the magnet array holder 202 with all magnet pieces 204 and all non-magnet pieces 206 positioned therein to form the magnet array 110, in accordance with some first embodiments of the present invention.

In some embodiments, the pattern for assembly of the magnet array 110 starts with insertion of the non-magnet pieces 206 or at least pairs of magnet pieces 206 into their respective slots 214. Because the non-magnet pieces 206 do not interfere with each other, the non-magnet pieces 206 can be inserted with little to no effort. Then, the magnet pieces 204 can be inserted into the pockets 216 between pairs of non-magnet pieces 206. The pairs of non-magnet pieces 206 establish fixturing/walls for the magnet pieces 204 so that the attractive and repulsive forces can be supported during insertion, thereby reducing the risk of breakage of the magnet pieces 204 (which can be brittle) and the risk of magnet pieces 204 being propelled. It will be appreciated that the pattern can be similar for assembly of a magnet array 400 that includes an alternating sequence of up/down polarized magnet pieces and left-right polarized magnet pieces. The pattern can begin with the up-down or left-right polarized magnet pieces being positioned in slots, and then the left-right or up-down polarized pieces being added between each pair of up/down polarized pieces.

Assembly time is accelerated by about factor of ten when compared to conventional assembly. Alignment is predictable and can be accurately calculated. This allows for detailed study of the effects of tolerances of individual magnet pieces 204 and the magnet array holder 202 itself as it relates to the performance of the magnetic circuit design and the field that is generated to manipulate the electron beam.

Figure 4A:
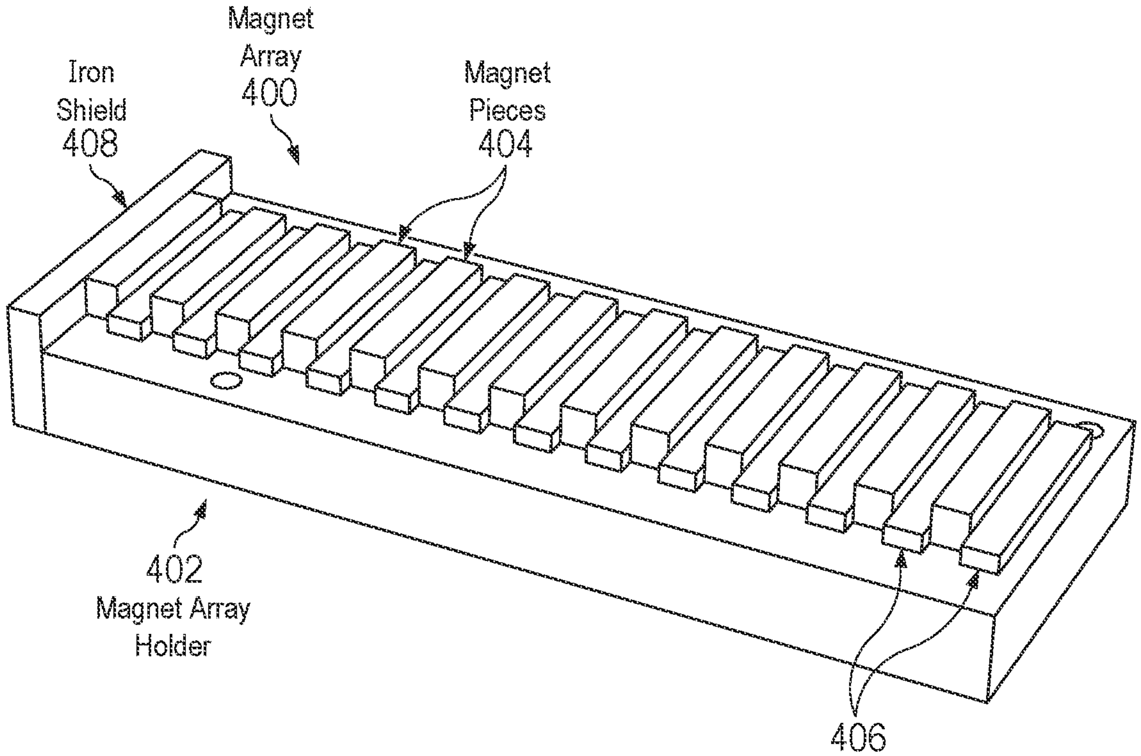
FIG. 4*a* illustrates a top perspective view of an example magnet array in accordance with some second embodiments of the present invention.

FIG. 4*a* illustrates a top perspective view of an example magnet array 400 in accordance with some second embodiments of the present invention. Like magnet array 110, the magnet array 400 includes a magnet array holder 402, an iron shield 408, magnet pieces 404 in pockets, and non-magnet pieces 406 in slots. The magnet array 400 is similar to the magnet array 110, except that the shapes of the magnet array holder 402, magnet pieces 404, non-magnet pieces 406 and iron shield 408 are different.

Figure 4B:
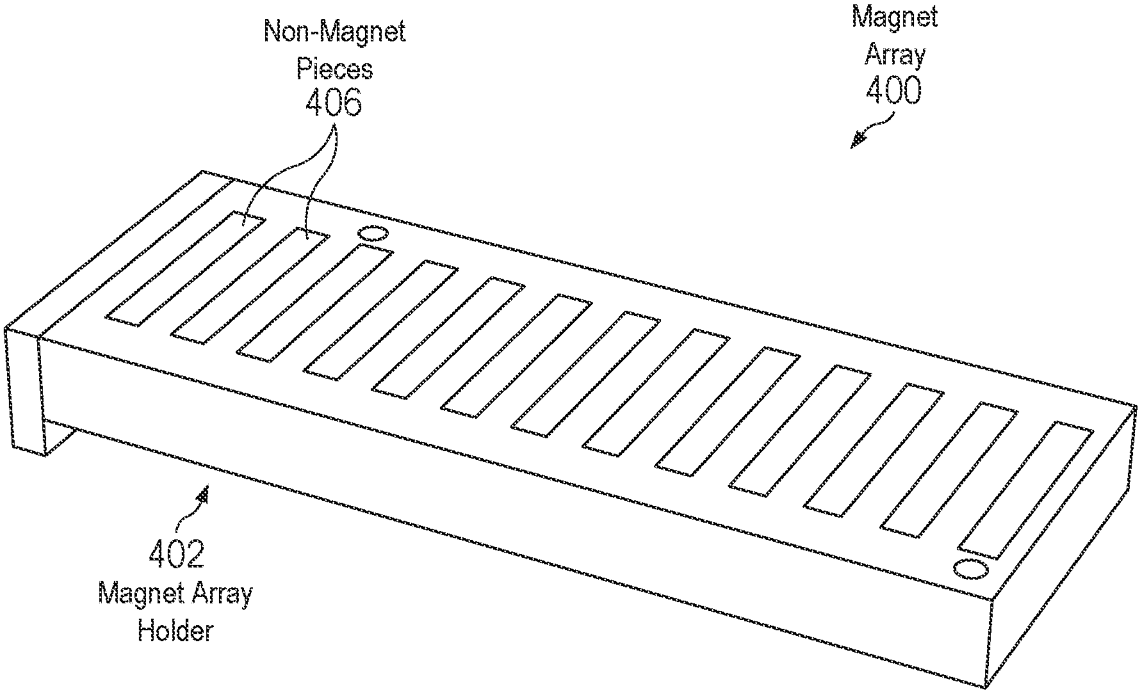
FIG. 4*b* illustrates a bottom perspective view of an example magnet array in accordance with some second embodiments of the present invention.

FIG. 4*b* illustrates a bottom perspective view of an example magnet array 400 in accordance with some second embodiments of the present invention. The magnet array holder 402 does not include additional pockets for additional magnet pieces (e.g., quadrupole magnet pieces) on the bottom side.

Figure 4C:
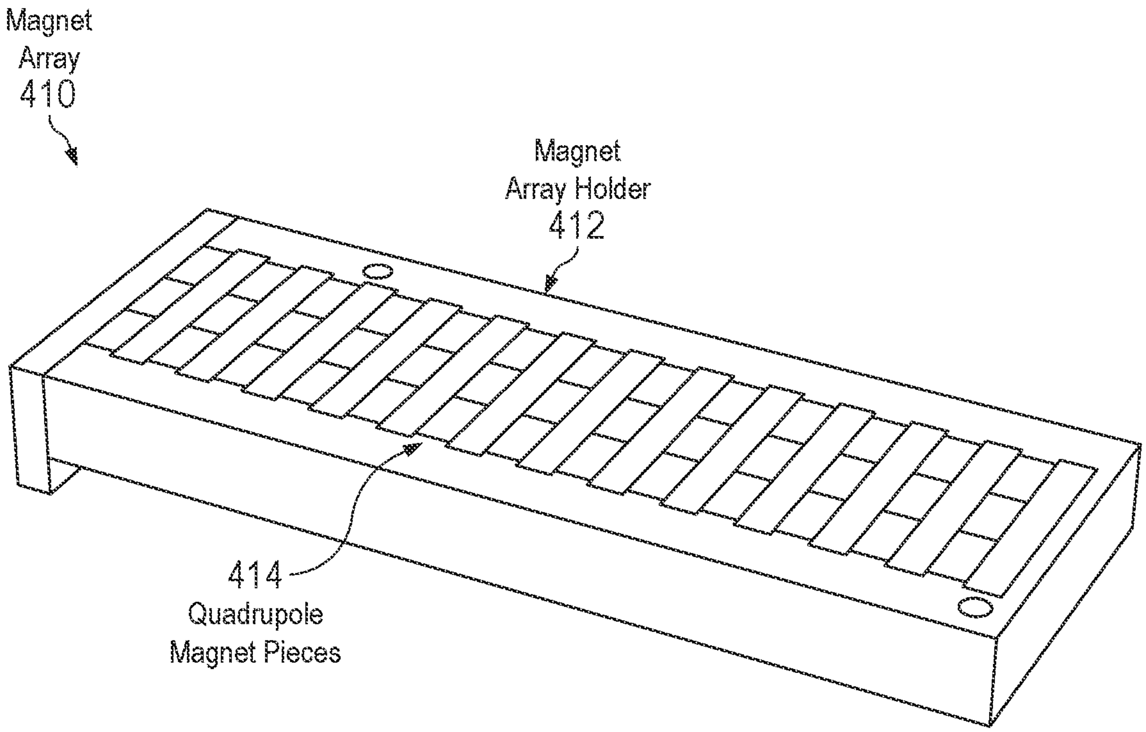
FIG. 4*c* illustrates a bottom perspective view of an example magnet array in accordance with some third embodiments of the present invention.

FIG. 4*c* illustrates a bottom perspective view of an example magnet array 410 in accordance with some third embodiments of the present invention. The magnet array 410 may include the same top side as the magnet array 400. However, the magnet array 410 may include a magnet array holder 412 with a different bottom side that includes additional pockets configured to receive additional (quadrupole) magnet pieces 414 contained therein.

Figure 4D:
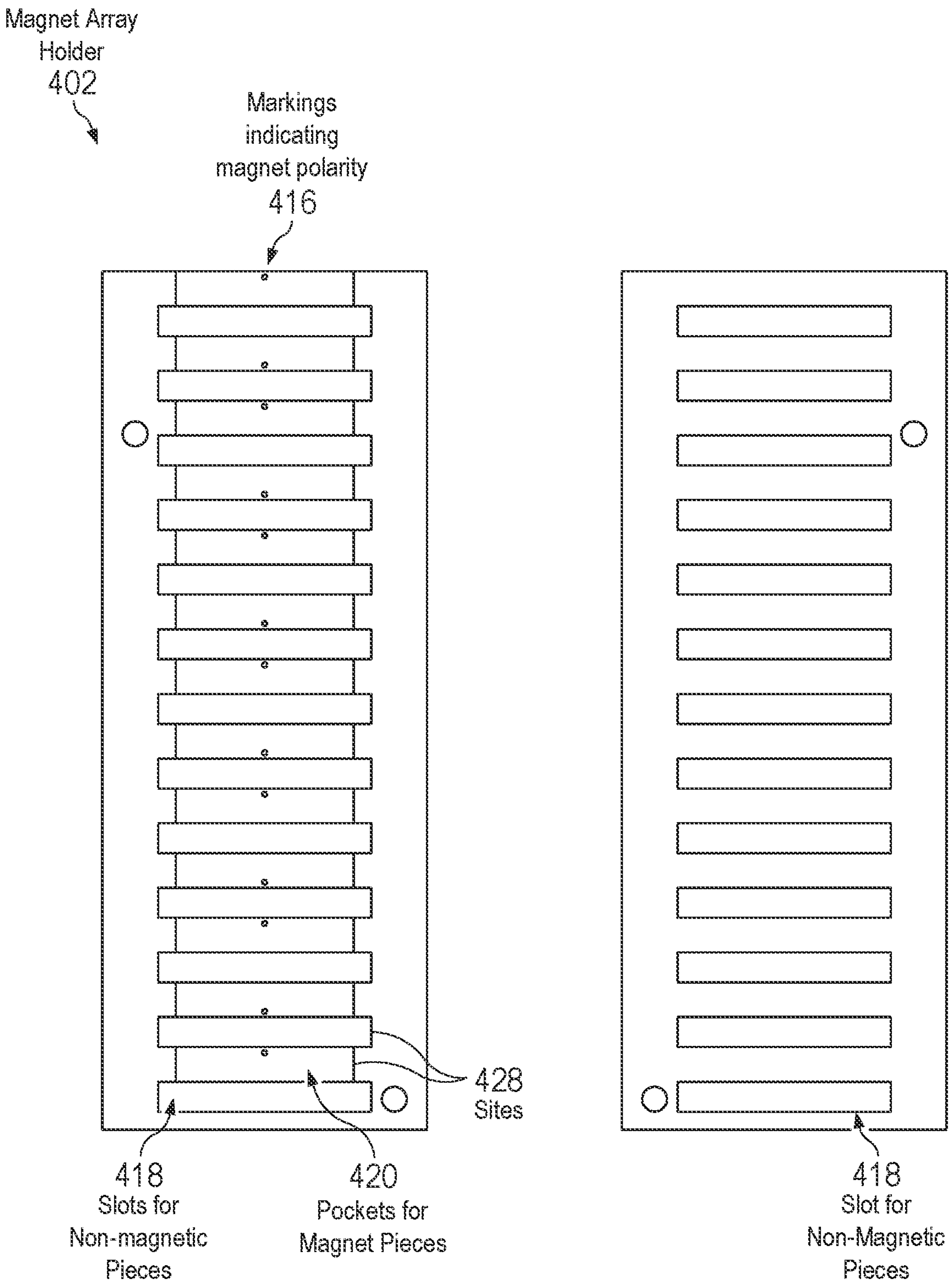
FIG. 4*d* illustrates top and bottom views of an example magnet array holder in accordance with some second embodiments of the present invention.

FIG. 4*d* illustrates top and bottom views of the magnet array holder 402 in accordance with some second embodiments of the present invention. In some embodiments, as shown, the top side of the magnet array holder 402 includes slots 418 for receiving non-magnet pieces 406 and pockets 420 for receiving magnet pieces 404. The slots 418 and pockets 420 may be generally referred to as sites 428. Markings 416 may be added to pockets 420 of the magnet array holder 402 to identify magnet polarity of magnet pieces 404 to be placed therein, such that an assembly person can match the markings 416 during the assembly process to ensure appropriate magnet orientation. The markings 416 may be added to either or both magnet pieces 404 and the magnet array holder 402. It will be appreciated that the markings 416 may include written markings 416 or physical markings 416 (i.e., keys) to ensure proper orientation of the magnet pieces 404.

In some embodiments, as shown, the markings 212 on the top (exposed) side of the magnet array holder 202 depict an alternating pattern of north-directed and south-directed magnet pieces 204 to be positioned in the pockets 216.

Figure 4E:
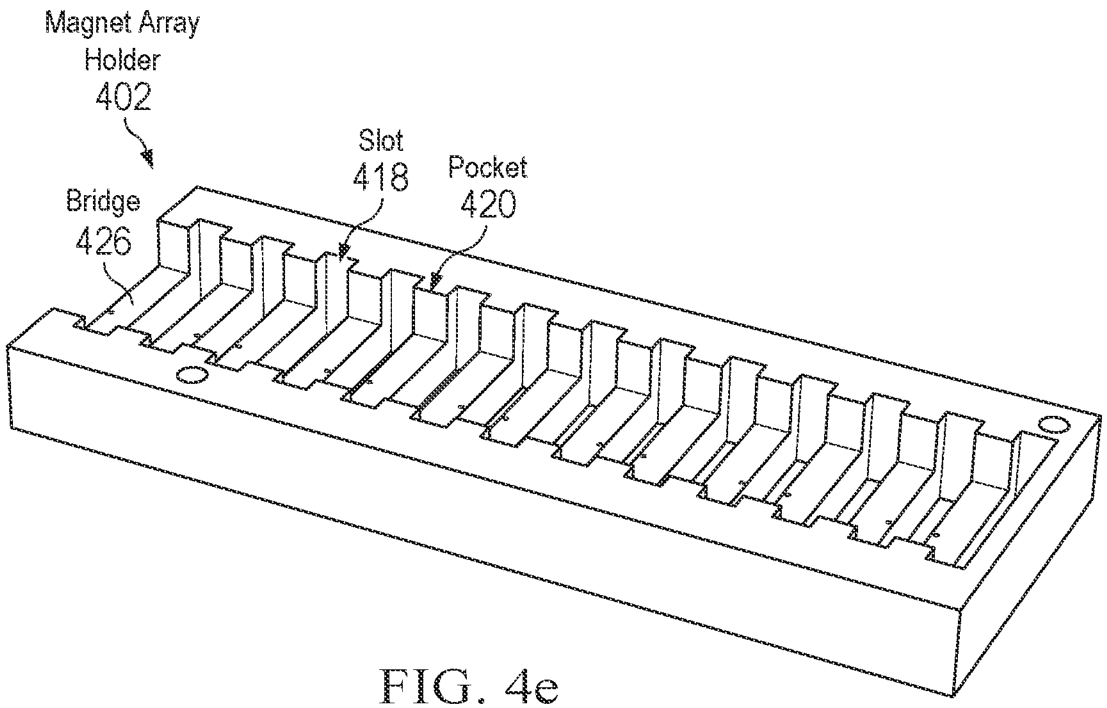
FIG. 4*e* illustrates a top perspective view of an example magnet array holder in accordance with some second embodiments of the present invention.

FIG. 4*e* illustrates a top perspective view of the magnet array holder 402 in accordance with some second embodiments of the present invention. The magnet array holder 402 includes an alternating sequence of slots 418 for receiving the non-magnet pieces 406 and pockets 420 for receiving the magnet pieces 404. The magnet array holder 402 further shows the bridges at the bottom of the pockets 420.

Figure 4F:
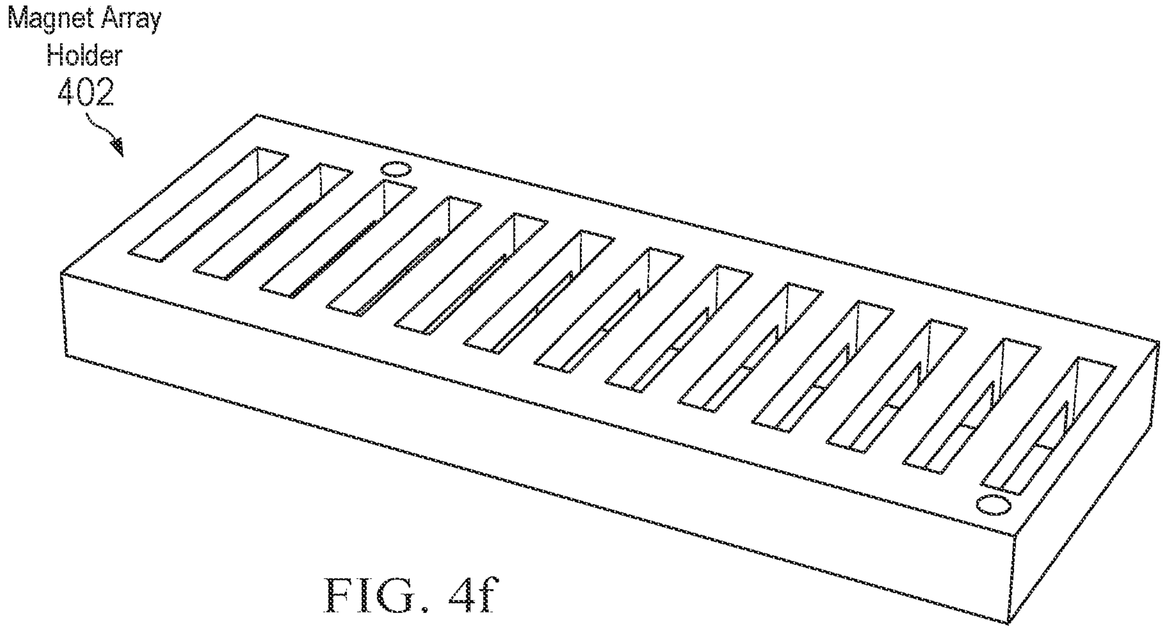
FIG. 4*f* illustrates a bottom perspective view of an example magnet array holder in accordance with some second embodiments of the present invention.

FIG. 4*f* illustrates a bottom perspective view of the magnet array holder 402 in accordance with some second embodiments of the present invention. The magnet array holder 402 does not include an array of pockets for receiving additional magnet pieces (e.g., quadrupole magnet pieces). The magnet array holder 402 shows the opening of the slots for receiving the non-magnet pieces 406.

Figure 4G:
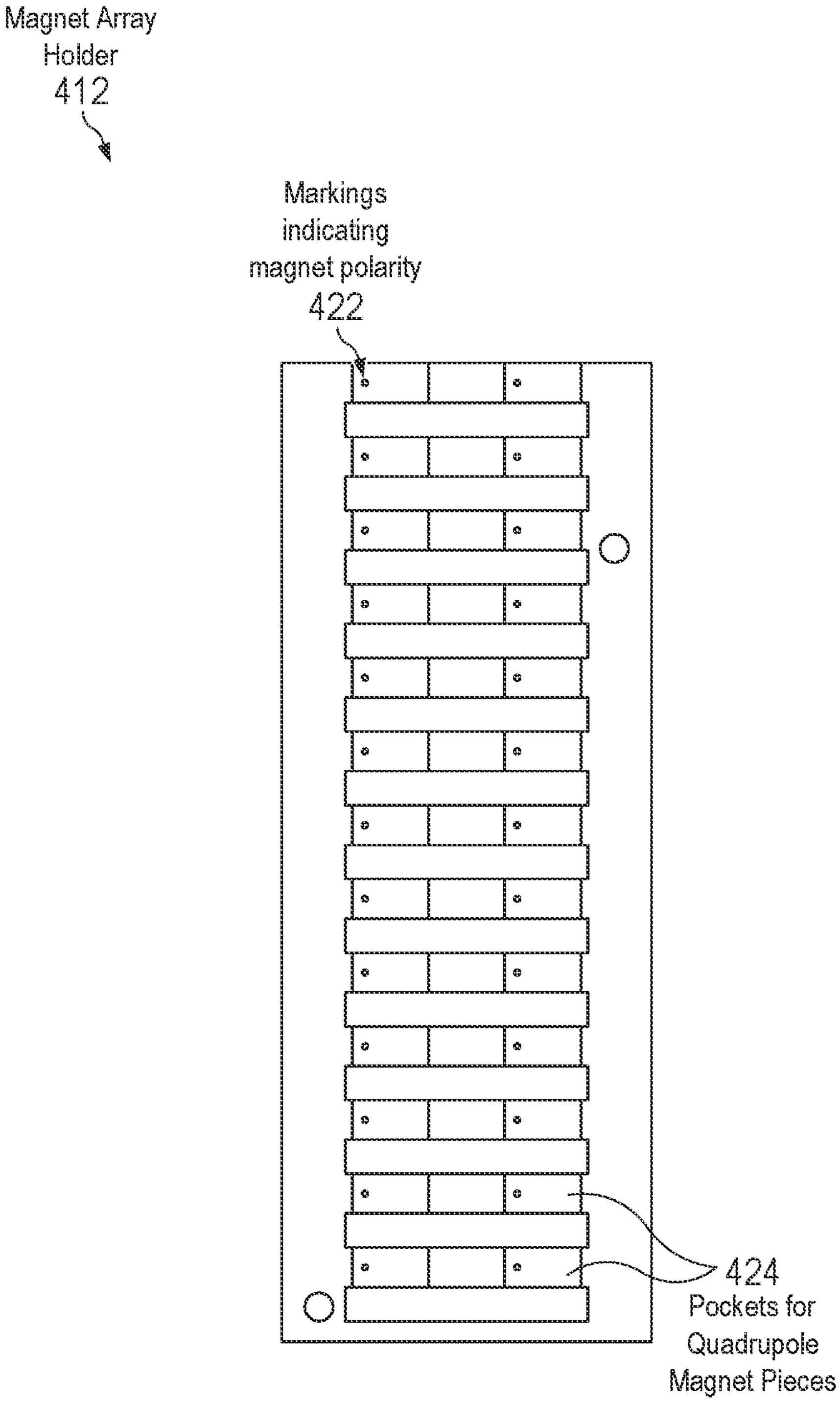
FIG. 4*g* illustrates a bottom view of an example magnet array holder in accordance with some third embodiments of the present invention.

FIG. 4*g* illustrates a bottom view of the magnet array holder 412 in accordance with some third embodiments of the present invention. In some embodiments, as shown, the bottom side of the example magnet array holder 412 includes pockets 424 for the additional (quadrupole) magnet pieces 414.

Markings 422 may be added to pockets 424 of the magnet array holder 402 to identify magnet polarity of magnet pieces 414 to be placed therein, such that an assembly person can match the markings 414 during the assembly process to ensure appropriate magnet orientation. The markings 414 may be added to either or both magnet pieces 414 and the magnet array holder 412. It will be appreciated that the markings 422 may include written markings 422 or physical markings 422 (i.e., keys) to ensure proper orientation of the magnet pieces 414. In some embodiments, as shown, the markings 422 on the bottom side (side positioned against the TWT 100) of the magnet array holder 412 depict a pattern of south-directed or north-directed or opposing-directed additional (quadrupole) magnet pieces 414 to be positioned in the pockets 424.

Figure 4H:
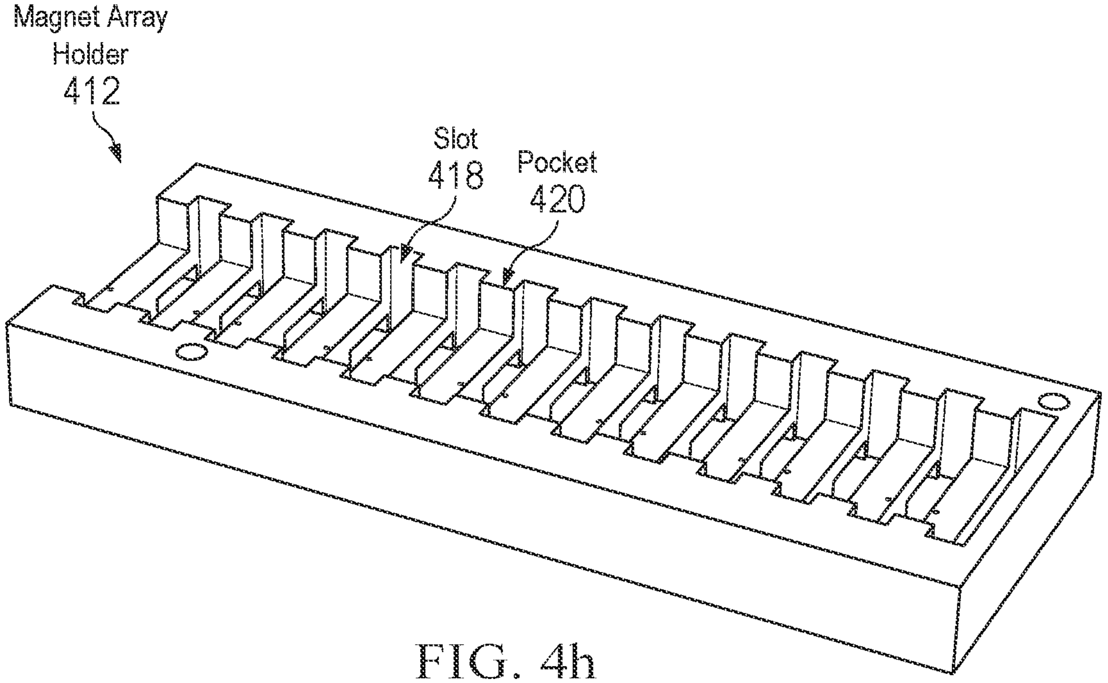
FIG. 4*h* illustrates a top perspective view of an example magnet array holder in accordance with some third embodiments of the present invention.

FIG. 4*h* illustrates a top perspective view of the magnet array holder 412 in accordance with some third embodiments of the present invention. The magnet array holder 412 includes an alternating sequence of slots 418 for receiving the non-magnet pieces 406 and pockets 420 for receiving the magnet pieces 404.

Figure 4I:
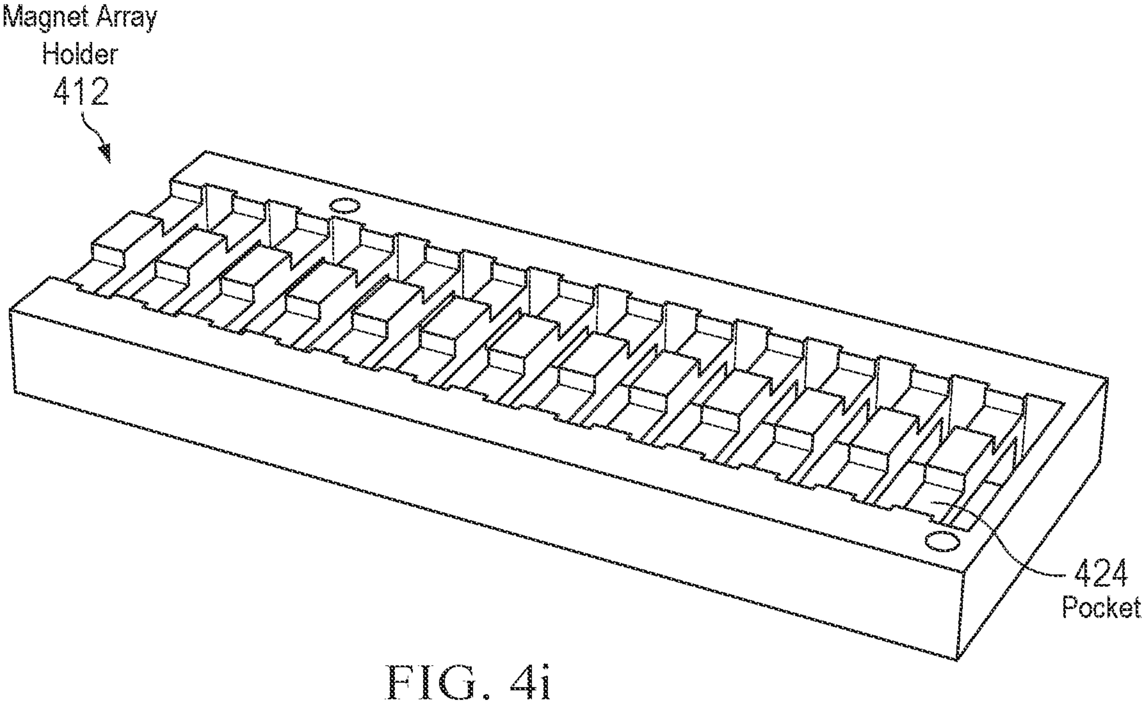
FIG. 4*i* illustrates a bottom perspective view of an example magnet array holder in accordance with some third embodiments of the present invention.

FIG. 4*i* illustrates a bottom perspective view of the magnet array holder 412 in accordance with some third embodiments of the present invention. The magnet array holder 412 includes an array of pockets 424 for receiving additional magnet pieces 414 (e.g., quadrupole magnet pieces).

Figure 4J:
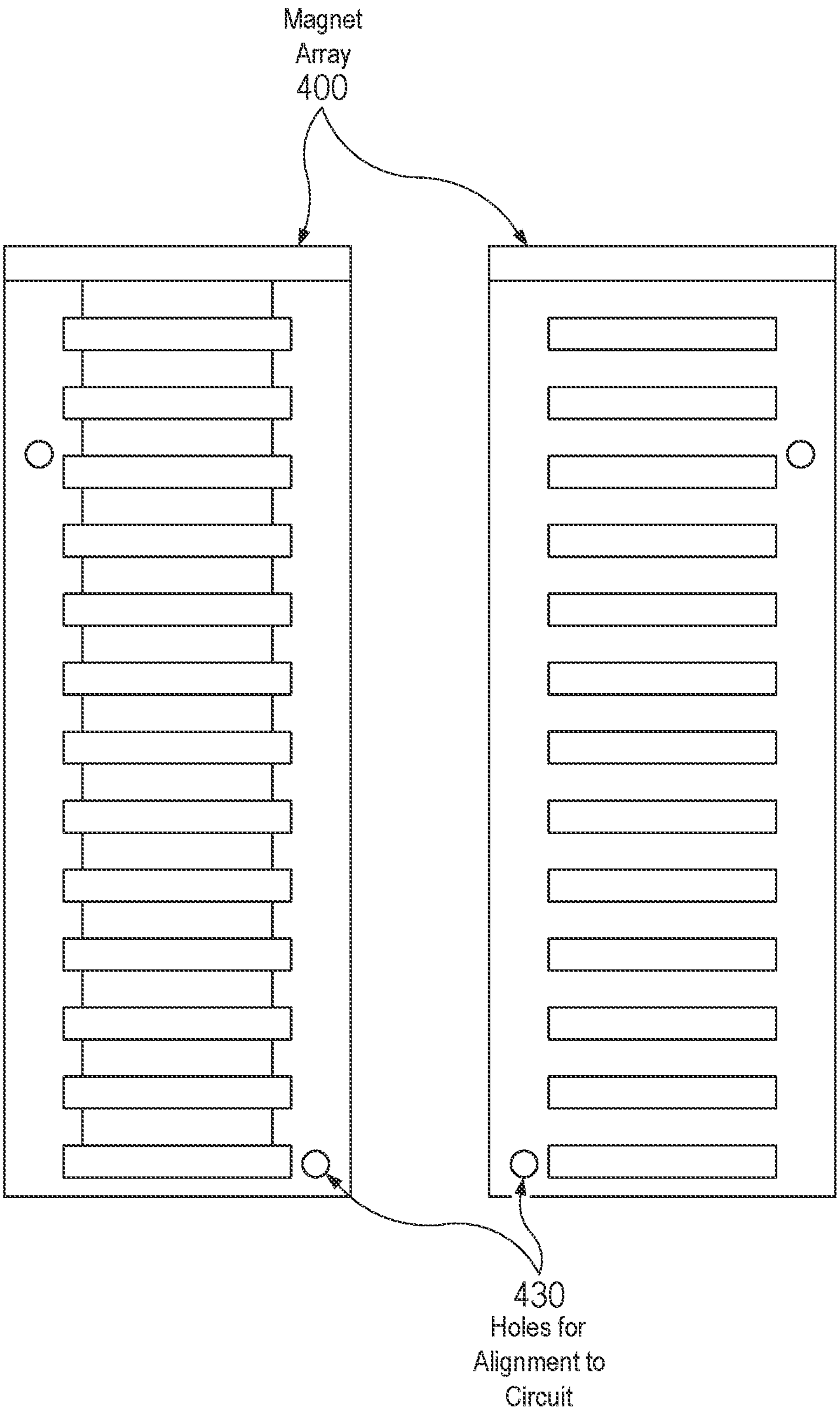
FIG. 4*j* illustrates top and bottom views of an example magnet array in accordance with some second embodiments of the present invention.

FIG. 4*j* illustrates top and bottom views of the magnet array 400 in accordance with some second embodiments of the present invention. As shown, the magnet array 400 includes holes 420 for aligning the magnet array 110.

Figure 4K:
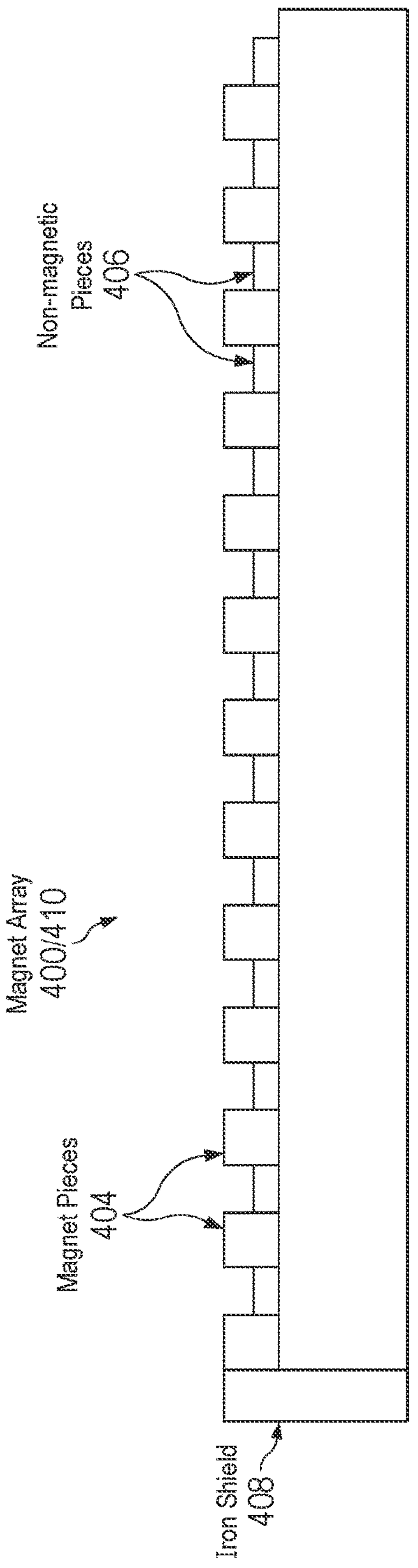
FIG. 4*k* illustrates a side view of an example magnet array in accordance with second embodiments of the present invention.

FIG. 4*k* illustrates a side view of the magnet array 400/410 in accordance with second embodiments of the present invention. As shown, the magnet array 400/410 includes a magnet array holder 402/412 with an iron shield 408 attached to the front edge followed by, in this embodiment, an alternating sequence of magnet pieces 404 and non-magnet pieces 406. Other patterns of magnet pieces 404 and non-magnet pieces 406 are also possible to achieve the desired interaction.

Figure 4L:
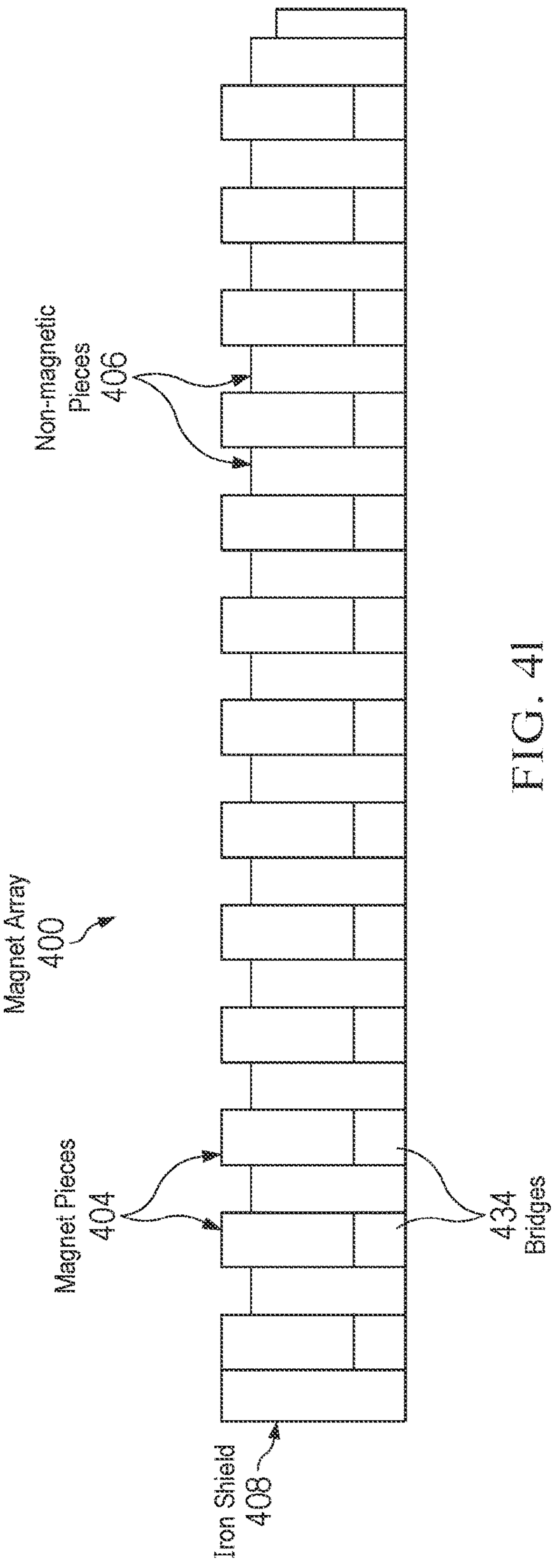
FIG. 4*l* illustrates a cross-sectional side view of an example magnet array in accordance with second embodiments of the present invention.

FIG. 4*l* illustrates a cross-sectional side view of the magnet array 400/410 in accordance with second embodiments of the present invention. The magnet array 400/410 in FIG. 4*l* assists to show the depth, height position and heights of the magnet pieces 404 and non-magnet pieces 406. In some embodiments, as shown, the magnet pieces 404 rest on top of a sequence of bridges 434 disposed on the bottom of the magnet array holder 402, and the non-magnet pieces 406 extend between and past the bridges 434, fully to (or some embodiments past) the bottom surface of the magnet array holder 402.

Figure 4M:
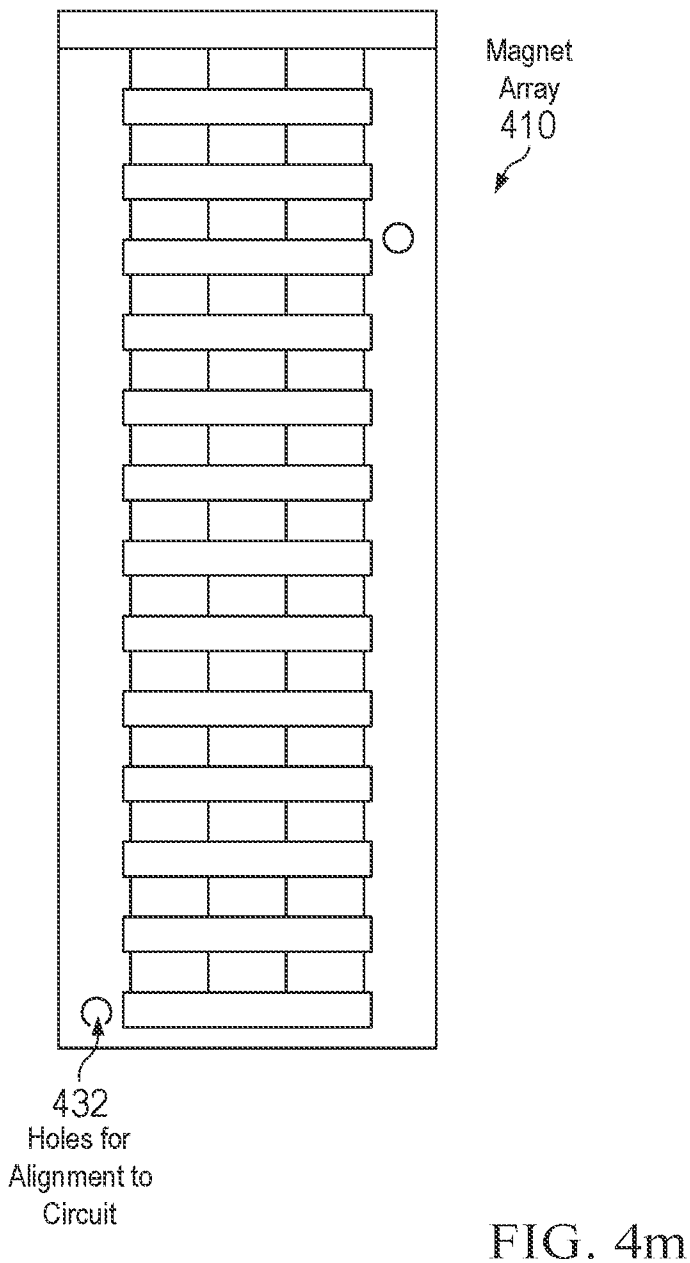
FIG. 4*m* illustrates a bottom view of an example magnet array in accordance with some third embodiments of the present invention.

FIG. 4*m* illustrates a bottom view of the magnet array 410 in accordance with some third embodiments of the present invention. As shown, the magnet array 410 includes holes 432 for aligning the magnet array 410.

Figure 5A:
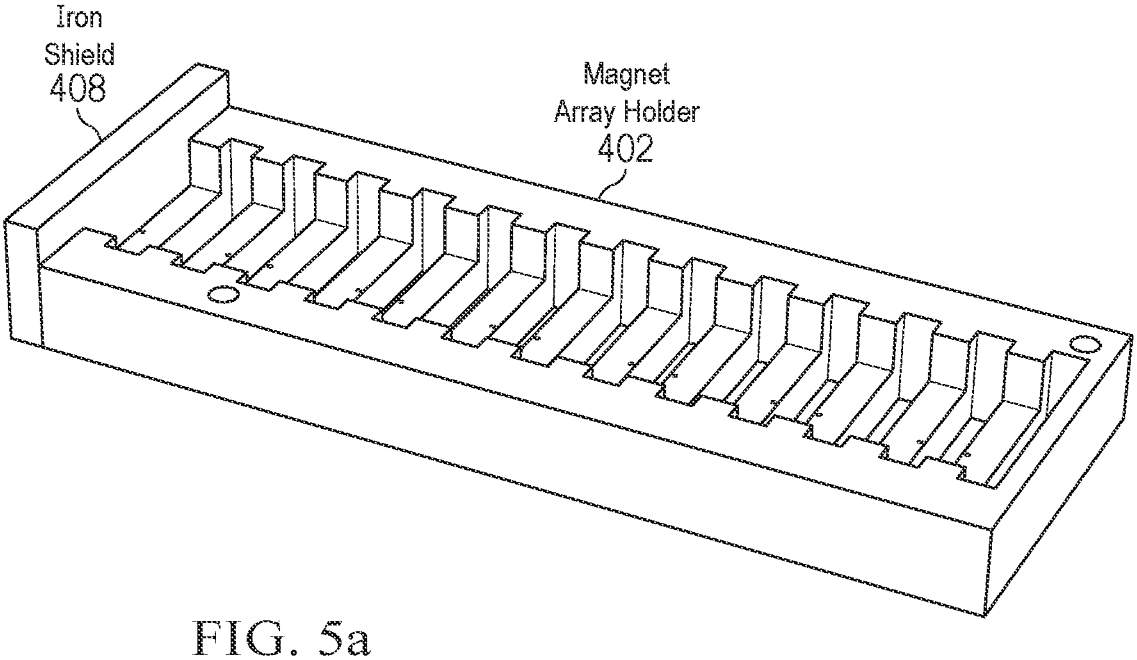
FIG. 5*a* illustrates a top perspective view of an example magnet array holder in accordance with some second embodiments of the present invention.
Figure 5B:
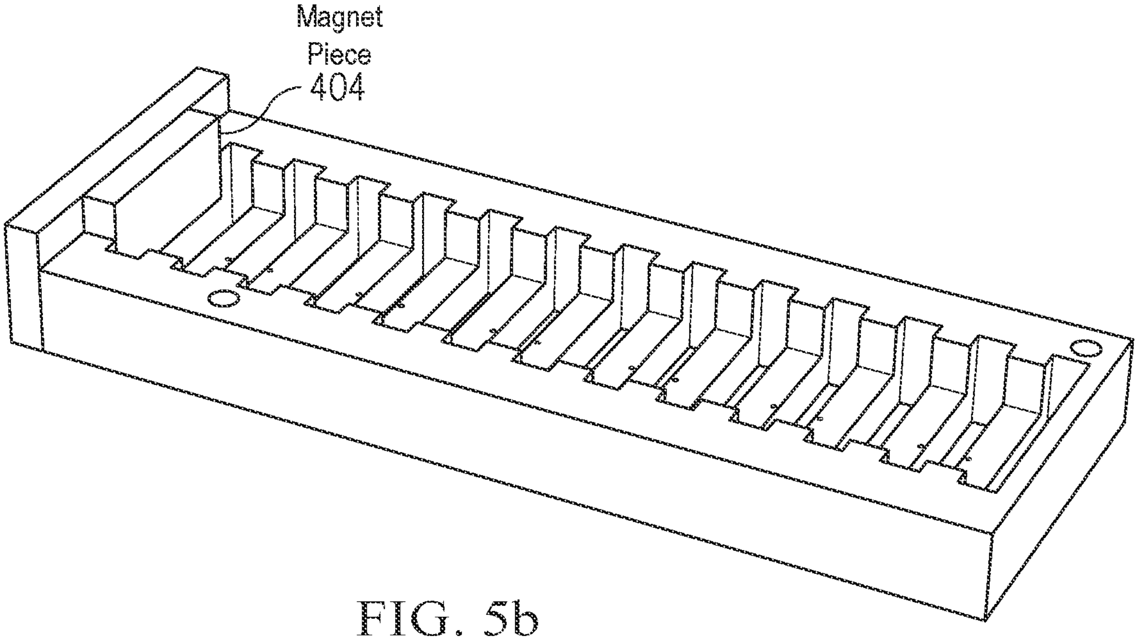
FIG. 5*b* illustrates a top perspective view of an example magnet array holder with one magnet piece positioned therein in accordance with some second embodiments of the present invention.
Figure 5C:
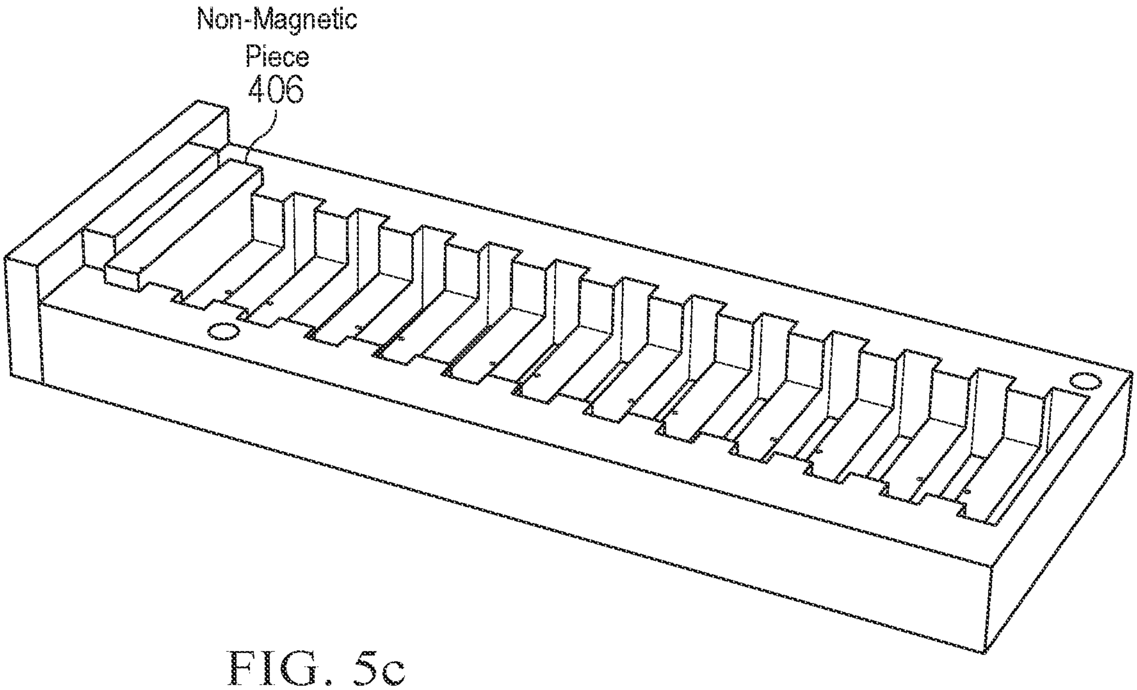
FIG. 5*c* illustrates a top perspective view of an example magnet array holder with one magnet piece and one non-magnet piece positioned therein in accordance with some second embodiments of the present invention.
Figure 5D:
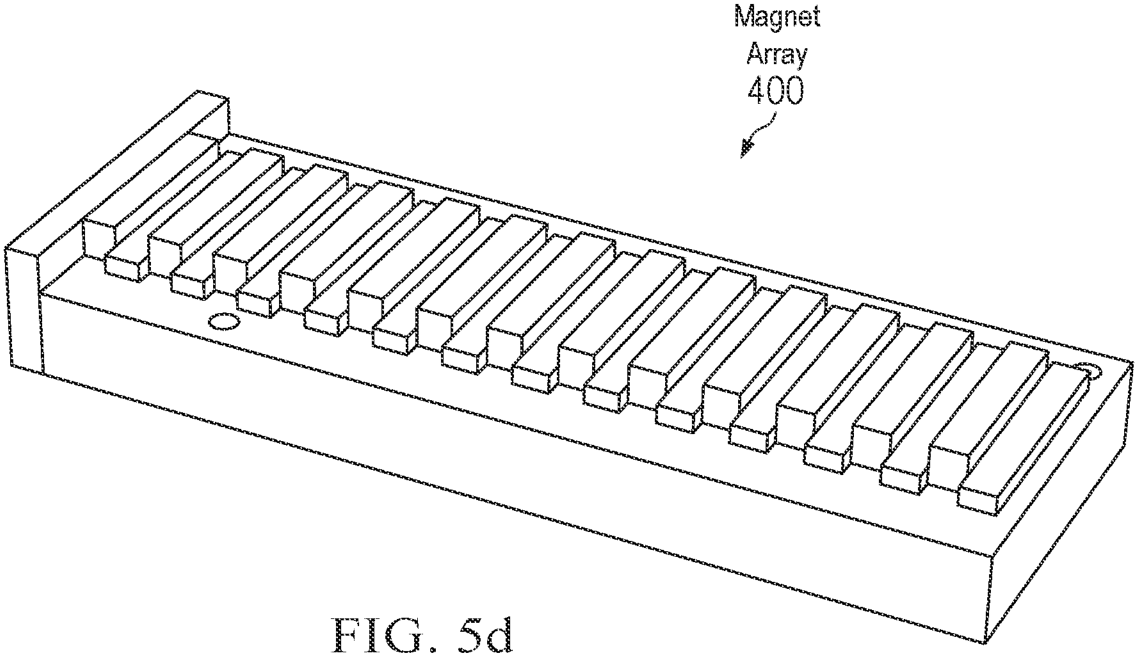
FIG. 5*d* illustrates a top perspective view of an example magnet array holder with all magnet pieces and all non-magnet pieces positioned therein in accordance with some second embodiments of the present invention.

FIGS. 5*a*-5*d* show an example assembly process of the magnet array 400 using the example magnet array holder 402. FIG. 5*a* illustrates a top perspective view of the magnet array holder 402 in accordance with some first embodiments of the present invention. As shown, an iron shield 408 is attached to the front edge of the magnet array holder 402. FIG. 5*b* illustrates a top perspective view of the magnet array holder 402 with one magnet piece 404 positioned adjacent the iron shield 408 and may serve as fixturing for insertion of the next component, in accordance with some first embodiments of the present invention. FIG. 5*c* illustrates a top perspective view of the magnet array holder 402 with one magnet piece 404 and one non-magnet piece 406 positioned adjacent the magnet piece 404 and which may serve as fixturing for insertion of the next component, in accordance with some first embodiments of the present invention. FIG. 5*d* illustrates a top perspective view of the magnet array holder 402 with all magnet pieces 404 and all non-magnet pieces 406 positioned therein to form the magnet array 400, in accordance with some first embodiments of the present invention.

Similarly to FIGS. 3*a*-3*d*, in some embodiments, the pattern for assembly of the magnet array 400 starts with insertion of the non-magnet pieces 406 or at least pairs of magnet pieces 406 into their respective slots 418. Because the non-magnet pieces 406 do not interfere with each other, the non-magnet pieces 406 can be inserted with little to no effort. Then, the magnet pieces 404 can be inserted into the pockets 420 between pairs of non-magnet pieces 406. The pairs of non-magnet pieces 406 establish fixturing/walls for the magnet pieces 404 so that the attractive and repulsive forces can be supported during insertion, thereby reducing the risk of breakage of the magnet pieces 404 (which can be brittle) and the risk of magnet pieces 404 being propelled. It will be appreciated that the pattern can be similar for assembly of a magnet array 400 that includes an alternating sequence of up/down polarized magnet pieces and left-right polarized magnet pieces. The pattern can begin with the up-down or left-right polarized magnet pieces or at least pairs of the up/down polarized magnet pieces being positioned in slots, and then the left-right or up-down polarized pieces being added between each pair of up/down or left-right polarized pieces.

Figure 6A:
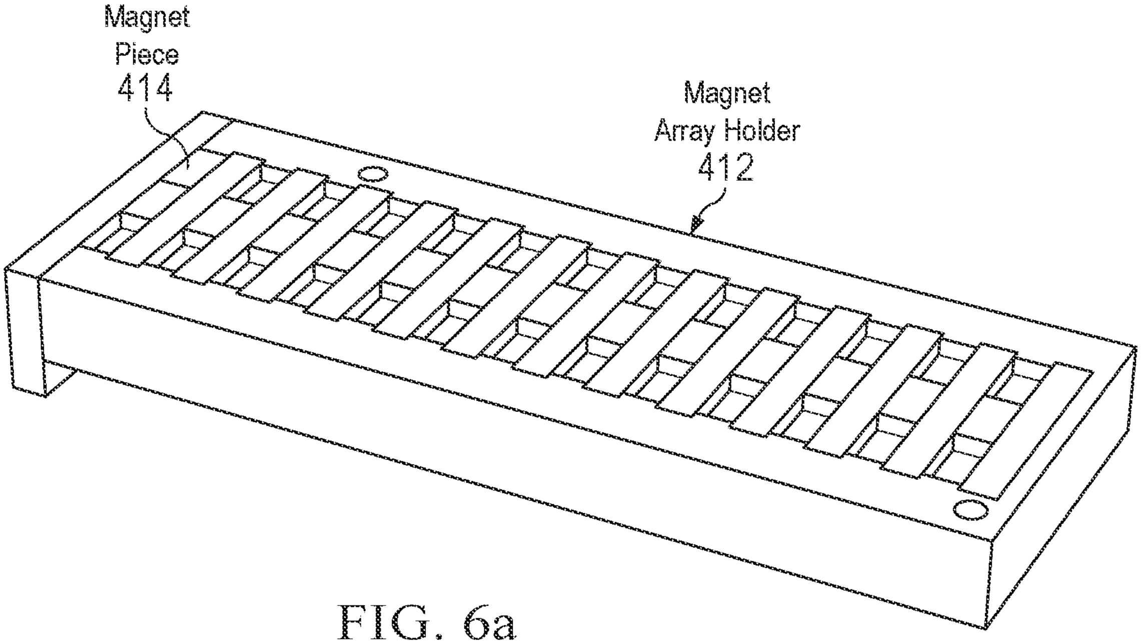
FIG. 6*a* illustrates a bottom perspective view of an example magnet array holder with one magnet piece positioned therein in accordance with some third embodiments of the present invention.
Figure 6B:
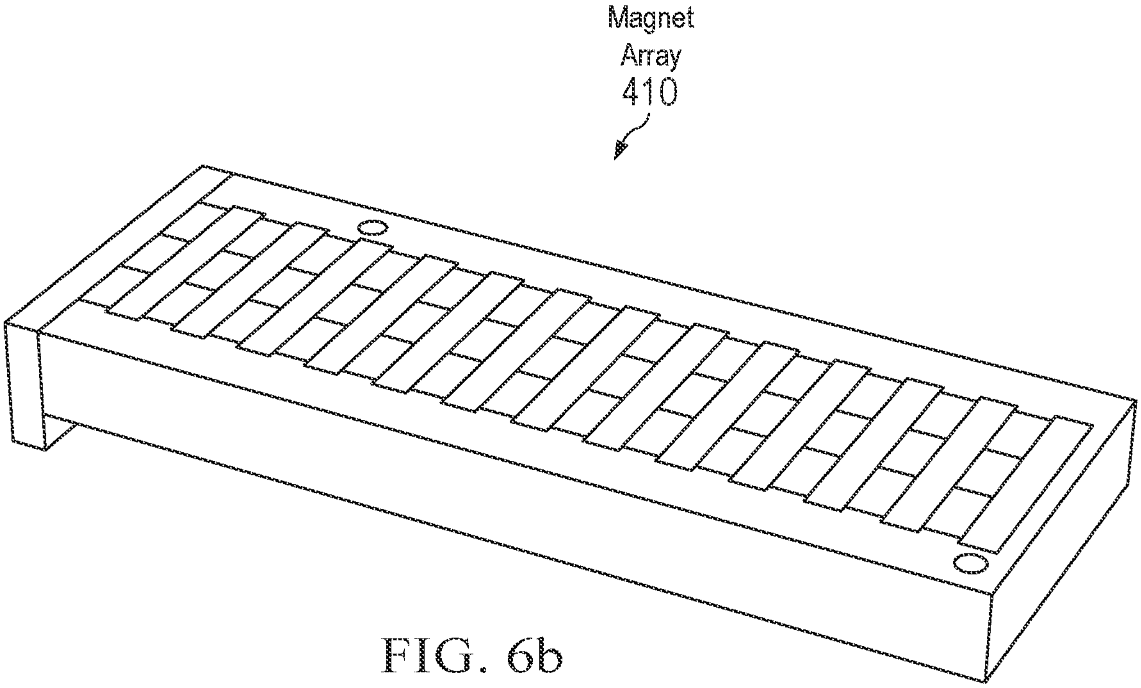
FIG. 6*b* illustrates a bottom perspective view of an example magnet array holder with all magnet pieces positioned therein in accordance with some third embodiments of the present invention.

FIGS. 6*a*-6*b* show an example assembly process of the magnet array 410 using the example magnet array holder 412. FIG. 6*a* illustrates a bottom perspective view of the magnet array holder 412 with one magnet piece 414 positioned therein in accordance with some third embodiments of the present invention. FIG. 6*b* illustrates a bottom perspective view of the magnet array holder 412 with all magnet pieces 414 positioned therein in accordance with some third embodiments of the present invention.

Figure 7A:
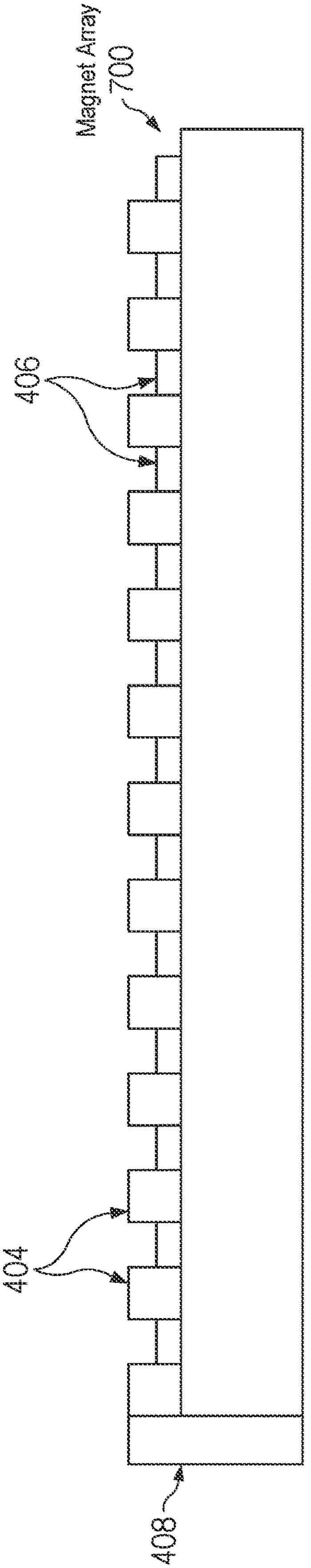
FIG. 7*a* illustrates a side view of an example top magnet array in accordance with some embodiments of the present invention.
Figure 7B:
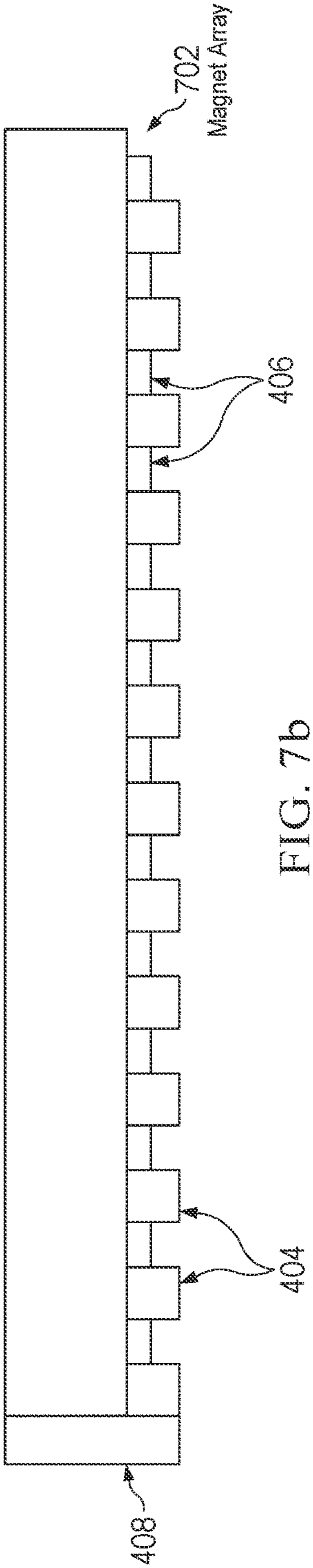
FIG. 7*b* illustrates a side view of an example bottom magnet array in accordance with some embodiments of the present invention.
Figure 7C:
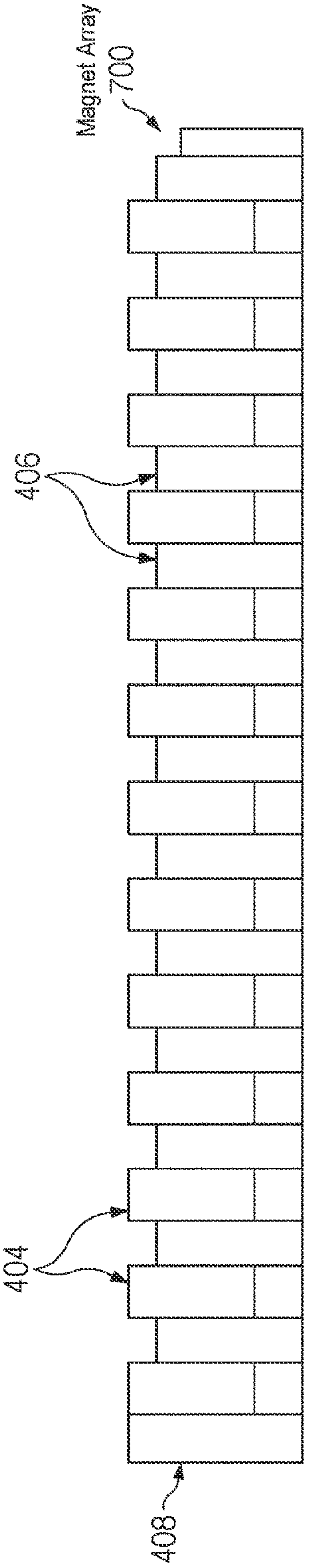
FIG. 7*c* illustrates a cross-sectional side view of an example top magnet array in accordance with some embodiments of the present invention.
Figure 7D:
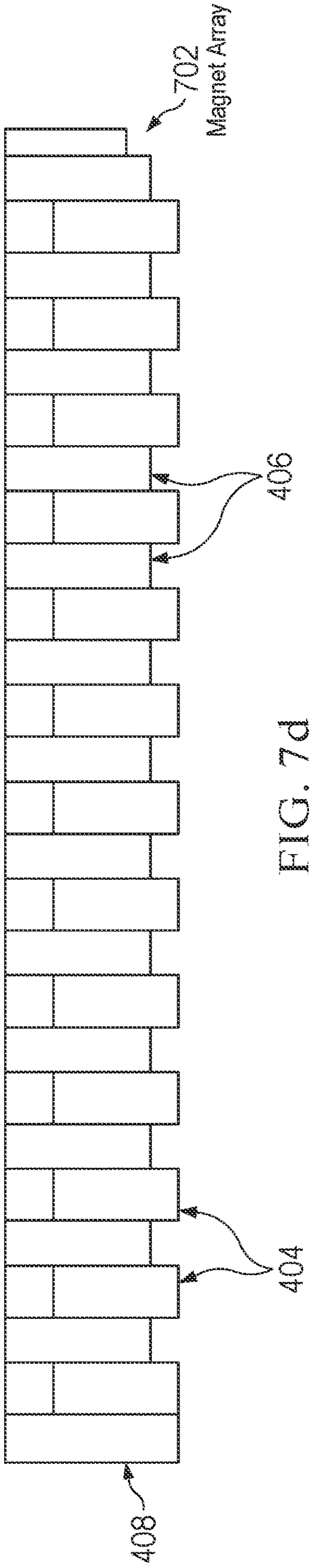
FIG. 7*d* illustrates a cross-sectional side view of an example bottom magnet array in accordance with some embodiments of the present invention.

FIGS. 7*a*-7*d* show example top and bottom magnet arrays 700 and 702 for establishing confinement and manipulation of the one or more electron beams. The positioning of individual magnet pieces 404 with respect to the upper and lower magnet arrays 700 and 702 may be critical to performance of the vacuum electronic device 100. FIG. 7*a* illustrates a side view of the top magnet array 700 in accordance with some embodiments of the present invention. The magnet array 110, 400 and 410 are each examples of the top magnet array 700. FIG. 7*b* illustrates a side view of the bottom magnet array 702 in accordance with some embodiments of the present invention. The magnet array 110, 400 and 410 are each examples of the bottom magnet array 702. FIG. 7*c* illustrates a cross-sectional side view of the top magnet array 700 in accordance with some embodiments of the present invention. FIG. 7*d* illustrates a cross-sectional side view of the bottom magnet array 702 in accordance with some embodiments of the present invention.

In some embodiments, the magnet array holder 202/402/412 may support only magnet pieces. In some embodiments, non-magnet dividers may be built into the magnet array holder 202/402/412 instead of some or all of the non-magnet pieces. In some embodiments, the magnet array holder 202/402/412 may be designed to include only a portion of the interaction circuit, such that other magnets may be located elsewhere, e.g., on one or more second magnet array holders, on the vacuum electronic device itself, etc. In some embodiments, the magnet array holder 202/402/412 may include magnetic portions, replacing some of the magnet pieces. In some embodiments, the different sites 202/402/412 may be designed to receive an alternating set of magnet pieces 204/404 of opposite polarities and no non-magnet pieces 206/406. Other combinations are possible.

The foregoing description of the preferred embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

The invention claimed is:

1. A magnet array holder configured to retain magnet pieces and/or non-magnet pieces to form a magnet array, the magnet array configured to manipulate one or more electron beams in a vacuum electronic device when assembled, the magnet array holder comprising:

a set of slots configured to receive magnet and/or non-magnet pieces;

a set of pockets to receive magnet and/or non-magnet pieces; and one or more attachment interfaces configured to couple the magnet array holder to a vacuum electronic device.

2. The magnet array holder of claim 1, wherein each slot the set of slots has a first shape and each pocket of the set of pockets has a second shape different than the first shape.

3. The magnet array holder of claim 1, wherein each pocket of the set of pockets has a bridge across it.

4. The magnet array holder of claim 1, wherein each pocket of the set of pockets includes a marking indicating a magnet piece orientation to assist in aligning the magnet piece.

5. The magnet array holder of claim 4, wherein the marking is a written key.

6. The magnet array holder of claim 1, wherein each pocket has a size, shape and position that controls a size, shape and position of the magnet or non-magnet piece received therein.

7. The magnet array holder of claim 1, wherein each slot has a size, shape and position that controls a size, shape and position of the magnet or non-magnet piece received therein.

8. The magnet array holder of claim 1, further comprising a set of additional sites configured to receive additional magnet or non-magnet pieces.

9. The magnet array holder of claim 8, wherein each site of the set of additional sites includes a marking indicating a magnet piece orientation to assist in aligning the additional magnet piece.

10. The magnet array holder of claim 1, wherein at least one slot of the set of slots extends through the magnet array holder.

11. The magnet array holder of claim 1, wherein the magnet array holder holds both magnet and non-magnet pieces.

12. The magnet array holder of claim 1, wherein the magnet array holder holds only magnet pieces.

13. The magnet array holder of claim 1, wherein the magnet array holder holds only a portion of an interaction circuit of the vacuum electronic device.

* * * * *